United States Patent
Fujita et al.

(10) Patent No.: US 11,146,863 B2
(45) Date of Patent: Oct. 12, 2021

(54) INFORMATION PROCESSING DEVICE, INFORMATION PROCESSING METHOD, AND MOVING IMAGE DISTRIBUTION SYSTEM

(71) Applicant: SONY CORPORATION, Tokyo (JP)

(72) Inventors: Takahisa Fujita, Kanagawa (JP); Hirotake Goto, Kanagawa (JP); Sumio Okada, Saitama (JP); Takaaki Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/083,256

(22) PCT Filed: Mar. 2, 2017

(86) PCT No.: PCT/JP2017/008289
§ 371 (c)(1),
(2) Date: Sep. 7, 2018

(87) PCT Pub. No.: WO2017/159383
PCT Pub. Date: Sep. 21, 2017

(65) Prior Publication Data
US 2019/0069041 A1 Feb. 28, 2019

(30) Foreign Application Priority Data
Mar. 16, 2016 (JP) .............................. JP2016-052669

(51) Int. Cl.
*H04N 21/81* (2011.01)
*H04N 21/44* (2011.01)
(Continued)

(52) U.S. Cl.
CPC ......... *H04N 21/8146* (2013.01); *G06T 13/00* (2013.01); *G06T 13/80* (2013.01);
(Continued)

(58) Field of Classification Search
CPC .......... H04N 21/8146; H04N 21/4312; H04N 21/44008; H04N 21/2187; G06T 13/00; G06T 13/80
See application file for complete search history.

(56) References Cited

U.S. PATENT DOCUMENTS

2014/0156364 A1* 6/2014 Zalewski ......... H04N 21/44012
705/14.4

FOREIGN PATENT DOCUMENTS

| JP | 2003-259214 A | 9/2003 |
| JP | 2004-253933 A | 9/2004 |

(Continued)

OTHER PUBLICATIONS

International Search Report and Written Opinion of PCT Application No. PCT/JP2017/008289, dated Jun. 6, 2017, 10 pages.

*Primary Examiner* — Kunal Langhnoja
(74) *Attorney, Agent, or Firm* — Chip Law Group

(57) ABSTRACT

Provided is an information processing device, an information processing method, and a moving image distribution system enabled to provide a moving image distribution service having higher interactivity. The information acquisition unit acquires information indicating that an additional image is caused to move from one to another of a distribution moving image display area and an outer area, the additional image being displayed on the distribution moving image display area for displaying a distribution moving image or on the outer area provided outside the distribution moving image display area. The display control unit controls display of the additional image on the basis of the information in a case where the additional image moves between the distribution moving image display area and the outer area.

15 Claims, 20 Drawing Sheets

(51) Int. Cl.
*H04N 21/431* (2011.01)
*G06T 13/00* (2011.01)
*G06T 13/80* (2011.01)
*H04N 21/2187* (2011.01)

(52) U.S. Cl.
CPC ..... *H04N 21/2187* (2013.01); *H04N 21/4312* (2013.01); *H04N 21/44008* (2013.01)

(56) References Cited

FOREIGN PATENT DOCUMENTS

| | | | |
|---|---|---|---|
| JP | 2012-209856 | A | 10/2012 |
| JP | 2012209856 | * | 10/2012 |
| JP | 5530557 | B1 | 6/2014 |
| WO | 2015/079865 | A1 | 6/2015 |
| WO | 2015/087609 | A1 | 6/2015 |
| WO | WO2015087609 | * | 6/2015 |

* cited by examiner

INFORMATION PROCESSING DEVICE, INFORMATION PROCESSING METHOD, AND MOVING IMAGE DISTRIBUTION SYSTEM

CROSS REFERENCE TO RELATED APPLICATIONS

This application is a U.S. National Phase of International Patent Application No. PCT/JP2017/008289 filed on Mar. 2, 2017, which claims priority benefit of Japanese Patent Application No. JP 2016-052669 filed in the Japan Patent Office on Mar. 16, 2016. Each of the above-referenced applications is hereby incorporated herein by reference in its entirety.

TECHNICAL FIELD

The present disclosure relates to an information processing device, an information processing method, a program, and a moving image distribution system, and more particularly relates to an information processing device, an information processing method, a program, and a moving image distribution system enabled to provide a moving image distribution service having higher interactivity.

BACKGROUND ART

Conventionally, in a live broadcast on the Internet using real time streaming, a moving image distribution service has been provided in which effects such as comments and balloons are superimposed on a broadcast moving image. In addition, a moving image distribution system has been provided in which a character is arranged in a peripheral drawing area of a moving image and is animated.

In such a moving image distribution system, by having interactivity such as displaying a comment of a viewer or moving the character in accordance with a rendition of a performer, the performer and the viewer can share a sense of unity.

For example, Patent Document 1 discloses an image synthesis system that edits a plurality of moving images acquired in a remote place in substantially real time to distribute a moving image obtained by synthesizing a plurality of moving images. In addition, Patent Document 2 discloses a streaming viewing system capable of distributing a streaming video to which different data is added for each viewing client.

CITATION LIST

Patent Document

Patent Document 1: Japanese Patent Application Laid-Open No. 2003-259214
Patent Document 2: Japanese Patent Application Laid-Open No. 2004-253933

SUMMARY OF THE INVENTION

Problems to be Solved by the Invention

Meanwhile, as described above, a moving image distribution system having interactivity has been provided conventionally, but a moving image distribution service having higher interactivity is required that further improves the sense of unity of the performer and the viewer.

The present disclosure has been made in view of such a circumstance, and is enabled to provide a moving image distribution service having higher interactivity.

Solutions to Problems

An information processing device of an aspect of the present disclosure includes: an information acquisition unit that acquires information indicating that an additional image is caused to move from one to another of a distribution moving image display area and an outer area, the additional image being displayed on the distribution moving image display area for displaying a distribution moving image or on the outer area provided outside the distribution moving image display area; and a display control unit that controls display of the additional image on the basis of the information in a case where the additional image moves between the distribution moving image display area and the outer area.

An information processing method or a program according to an aspect of the present disclosure includes: acquiring information indicating that an additional image is caused to move from one to another of a distribution moving image display area and an outer area, the additional image being displayed on the distribution moving image display area for displaying a distribution moving image or on the outer area provided outside the distribution moving image display area; and controlling display of the additional image on the basis of the information in a case where the additional image moves between the distribution moving image display area and the outer area.

A moving image distribution system of an aspect of the present disclosure includes a plurality of information processing devices connected together via a network, the information processing devices each including: an information acquisition unit that acquires information indicating that an additional image is caused to move from one to another of a distribution moving image display area and an outer area, the additional image being displayed on the distribution moving image display area for displaying a distribution moving image or on the outer area provided outside the distribution moving image display area; and a display control unit that controls display of the additional image on the basis of the information in a case where the additional image moves between the distribution moving image display area and the outer area.

In an aspect of the present disclosure, information is acquired indicating that an additional image is caused to move from one to another of a distribution moving image display area and an outer area, the additional image being displayed on the distribution moving image display area for displaying a distribution moving image or on the outer area provided outside the distribution moving image display area, and display is controlled of the additional image in a case where the additional image moves between the distribution moving image display area and the outer area on the basis of the information.

Effects of the Invention

According to an aspect of the present disclosure, a moving image distribution service having higher interactivity can be provided.

MODE FOR CARRYING OUT THE INVENTION

Hereinafter, a specific embodiment to which the present technology is applied will be described in detail with reference to the drawings.

Figure 1:
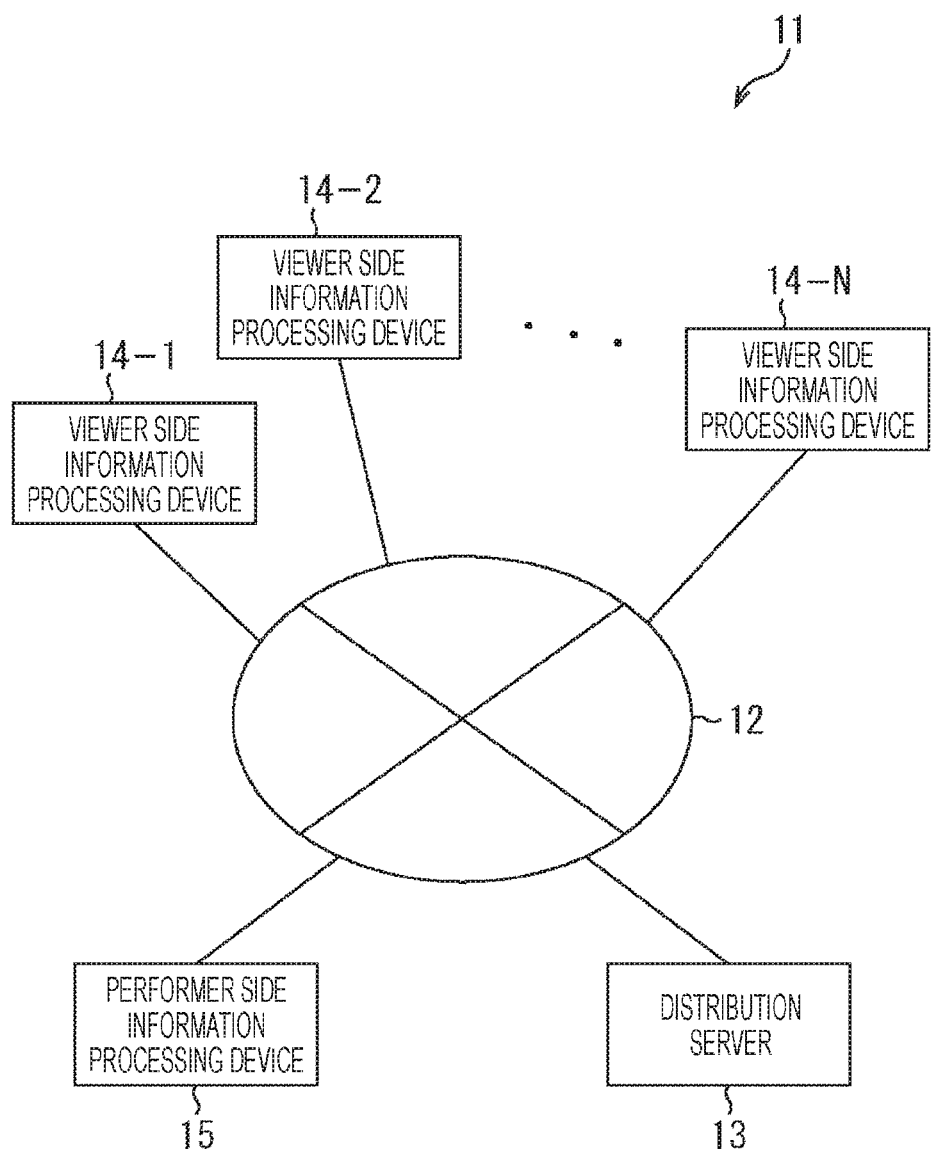
FIG. 1 is a block diagram illustrating a configuration example of an embodiment of a moving image distribution system to which the present technology is applied.

FIG. 1 is a block diagram illustrating a configuration example of an embodiment of a moving image distribution system to which the present technology is applied.

As illustrated in FIG. 1, a moving image distribution system 11 includes a distribution server 13, N (plural) viewer side information processing devices 14-1 to 14-N, and a performer side information processing device 15 connected together via a network 12 such as the Internet.

The distribution server 13 distributes a moving image transmitted from the performer side information processing device 15 to the viewer side information processing devices 14-1 to 14-N via the network 12. At this time, for example, the distribution server 13 applies display processing of superimposing an image (such as an item image A or a character image C described later) corresponding to a predetermined event on the moving image supplied from the performer side information processing device 15, and distributes a distribution moving image generated by the display processing.

The viewer side information processing devices 14-1 to 14-N display the distribution moving image distributed from the distribution server 13 via the network 12, to let respective users of the viewer side information processing devices 14-1 to 14-N to view the distribution moving image. Then, when operation is performed for generating a predetermined event to the distribution moving image by a viewer who is each of the users, the viewer side information processing devices 14-1 to 14-N transmit, to the distribution server 13, event information necessary for superimposing on the moving image an image corresponding to the event. Note that, the viewer side information processing devices 14-1 to 14-N are similarly configured, and each are referred to as a viewer side information processing device 14 as appropriate in a case where there is no need to distinguish the viewer side information processing devices.

The performer side information processing device 15 generates a moving image obtained by imaging a user of the performer side information processing device 15 as a performer, and sequentially transmits the moving image to the distribution server 13 via the network 12. In addition, similarly to the viewer side information processing device 14, the performer side information processing device 15 transmits, to the distribution server 13, event information necessary for superimposing on the moving image an image corresponding to an event depending on operation by the performer.

The moving image distribution system 11 configured in this way can provide a moving image distribution service that distributes a distribution moving image on which an image according to occurrence of an event by the viewer or the performer is superimposed on a moving image on which the performer is projected.

Here, with reference to a distribution moving image reproduction screen illustrated in FIG. 2, the moving image distribution service will be described provided by the moving image distribution system 11.

Figure 2:
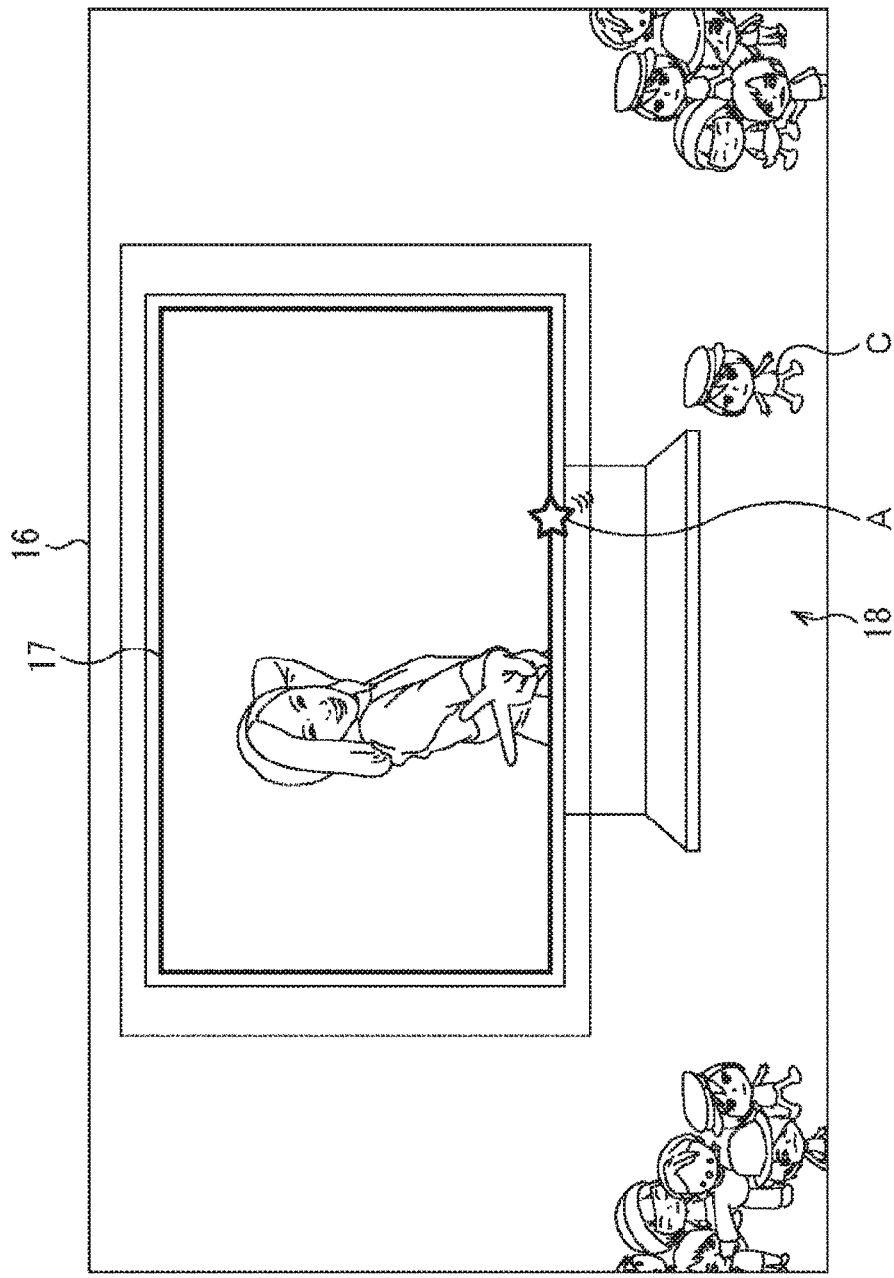
FIG. 2 is a diagram for describing a moving image distribution service provided by the moving image distribution system.

For example, on a display unit of each of the viewer side information processing device 14 and the performer side information processing device 15, a distribution moving image reproduction screen 16 is displayed as illustrated in FIG. 2.

In the distribution moving image reproduction screen 16, at a substantial center thereof, a distribution moving image display area 17 is arranged for displaying the distribution moving image distributed from the distribution server 13, and an area outside the distribution moving image display area 17 is set as an outer area 18.

In the distribution moving image display area 17, for example, a moving image transmitted from the performer side information processing device 15 to the distribution server 13, or a moving image obtained by applying the display processing to the moving image in the distribution server 13, is displayed as a distribution moving image.

In the outer area 18, for example, the character image C is displayed, as an avatar appearing on the screen, corresponding to the viewer viewing the distribution moving image in the viewer side information processing device 14 displaying the distribution moving image reproduction screen 16. In addition, in the outer area 18, a plurality of character images corresponding to viewers of the other plurality of viewer side information processing devices 14 is also displayed, and by these character images, a pseudo sharing can be experienced of viewing of the distribution moving images by the plural viewers.

Then, in the moving image distribution system 11, interactive display can be performed in which an interaction occurs between the viewer and the performer, corresponding to an event that occurs depending on the operation or the like of the viewer or the performer.

For example, it is assumed that the viewer of the viewer side information processing device 14 performs operation for generating an event of throwing an item from the viewer's own character image C toward the performer in the distribution moving image display area 17. In accordance with the operation, in the distribution moving image reproduction screen 16, interactive display is performed in which the item image A appears near the character image C displayed in the outer area 18 and moves toward the distribution moving image display area 17, and then is superimposed and displayed on the moving image in the distribution moving image display area 17, and reaches the performer.

At this time, in the moving image distribution system 11, the display of the item image A in the outer area 18 is performed in each of the viewer side information processing device 14 and the performer side information processing device 15, and the display of the item image A in the distribution moving image display area 17 is performed in the distribution server 13. Therefore, in the moving image distribution system 11, display control of the item image A is performed so that the item image A is displayed interlockingly before and after the item image A moves between the outer area 18 and the distribution moving image display area 17, for example, the item image A is displayed in a contiguous locus.

As described above, the moving image distribution system 11 performs the interactive display in which the viewer throws the item toward the performer, so that a moving image distribution service having higher interactivity can be provided for the viewer and the performer.

Figure 3:
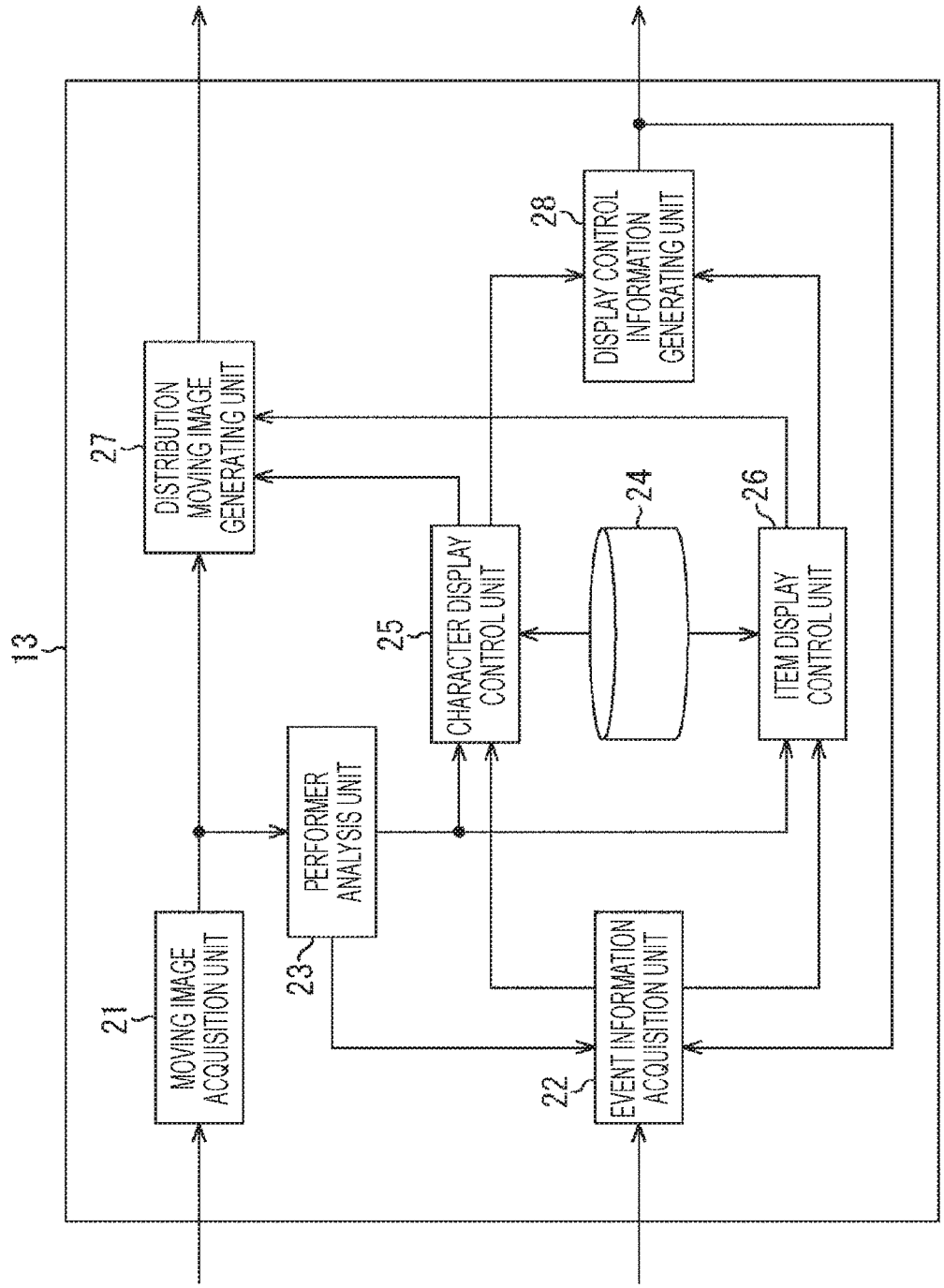
FIG. 3 is a block diagram illustrating a configuration example of a distribution server.

Next, FIG. 3 is a block diagram illustrating a configuration example of the distribution server 13 in FIG. 1.

As illustrated in FIG. 3, the distribution server 13 includes a moving image acquisition unit 21, an event information acquisition unit 22, a performer analysis unit 23, a storage unit 24, a character display control unit 25, an item display control unit 26, a distribution moving image generating unit 27, and a display control information generating unit 28. In addition, the distribution server 13 includes a communication unit (not illustrated), and with the communication unit, it is possible to communicate with the performer side information processing device 15 and the viewer side information processing device 14 via the network 12 in FIG. 1.

The moving image acquisition unit 21 acquires a moving image transmitted from the performer side information processing device 15 via the network 12, for example, a moving image on which the performer is projected, and supplies the moving image to the performer analysis unit 23 and the distribution moving image generating unit 27.

The event information acquisition unit 22 acquires event information transmitted from the viewer side information processing device 14 or the performer side information processing device 15 via the network 12. Then, the event information acquisition unit 22 supplies the event information to the character display control unit 25 or the item display control unit 26 as appropriate in accordance with the content of the event information.

For example, as described above with reference to FIG. 2, when the event occurs in which the character image C throws the item image A toward the distribution moving image, the viewer side information processing device 14 transmits event information indicating the content of the event via the network 12. Then, the event information acquisition unit 22 acquires the event information, and in accordance with the content thereof, supplies the event information to the item display control unit 26. At this time, the event information includes information necessary for causing the item image A to be displayed in the moving image interlockingly between the outer area 18 and the distribution moving image display area 17. For example, the event information includes information indicating the type of the item image A, and information indicating the timing, position, direction, speed, and the like at which the item image A moves from the outer area 18 to the distribution moving image display area 17.

In addition, for example, as described later with reference to FIGS. 7 and 8, in a case where an event occurs in which the character image C is displayed in the distribution moving image display area 17, the event information acquisition unit 22 supplies the event information to the character display control unit 25 in accordance with the content of the event information. At this time, the event information includes information necessary for causing the character image C to be displayed in the moving image interlockingly between the outer area 18 and the distribution moving image display area 17.

Figure 9:
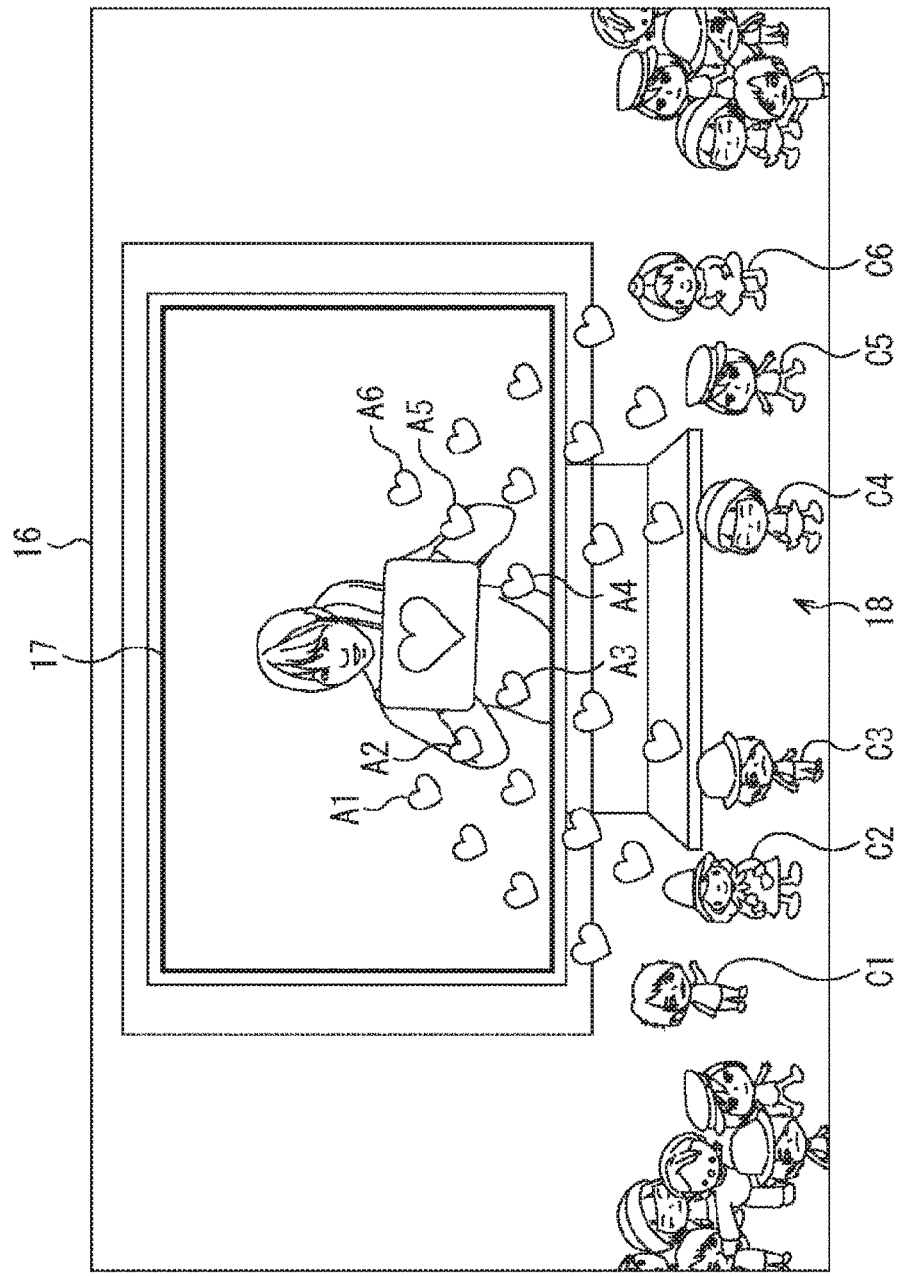
FIG. 9 is a diagram illustrating an interactive display in a third event.

The performer analysis unit 23 analyzes positions of the face and body of the performer projected on the moving image supplied from the moving image acquisition unit 21, and supplies performer display position information indicating a display position of the performer obtained as a result of the analysis to the character display control unit 25 and the item display control unit 26. In addition, the performer analysis unit 23 analyzes a motion, an expression, and the like of the performer, and analyzes an object (for example, a panel as illustrated in FIG. 9 described later) and the like held by the performer, to supply event information according to the analysis result to the event information acquisition unit 22.

For example, in the moving image distribution system 11, motions, expressions, and the like of the performer, or objects held by the performer are set as occurrence conditions for generating corresponding events, respectively. In accordance with such a setting, in a case where an analysis result obtained by analyzing the performer satisfies an occurrence condition of an event, the performer analysis unit 23 supplies event information corresponding to the analysis result to the event information acquisition unit 22.

The storage unit 24 stores various images such as the character image C caused to be superimposed and displayed on the moving image by the character display control unit 25, and the item image A caused to be superimposed and displayed on the moving image by the item display control unit 26.

The character display control unit 25 controls display of the character image C to be superimposed and displayed on the distribution moving image in the distribution moving image display area 17 in accordance with the event information supplied from the event information acquisition unit 22 and the performer display position information supplied from the performer analysis unit 23.

For example, in a case where the character image C moves from the outer area 18 to the distribution moving image display area 17, the character display control unit 25 first reads the character image C from the storage unit 24 on the basis of the event information. Then, the character display control unit 25 performs display control of the character image C in the distribution moving image display area 17 so that the display is performed interlockingly with the outer area 18 in accordance with the event information, and the character image C does not overlap the display position of the performer in accordance with the performer display position information. In addition, in a case where the character image C moves from the distribution moving image display area 17 to the outer area 18, the character display control unit 25 instructs the display control information generating unit 28 on the type of the character image C, the timing, position, direction, speed, and the like at which the character image C moves.

The item display control unit 26 controls display of the item image A to be superimposed and displayed on the distribution moving image in the distribution moving image display area 17 in accordance with the event information supplied from the event information acquisition unit 22 and the performer display position information supplied from the performer analysis unit 23.

For example, in a case where the item image A moves from the outer area 18 to the distribution moving image display area 17, the item display control unit 26 first reads the item image A from the storage unit 24 on the basis of the event information. Then, the item display control unit 26 performs display control of the item image A in the distribution moving image display area 17 so that the display is performed interlockingly with the outer area 18 in accordance with the event information, and the item image A does not overlap the display position of the performer in accordance with the performer display position information. In addition, in a case where the item image A moves from the distribution moving image display area 17 to the outer area 18, the item display control unit 26 instructs the display control information generating unit 28 on the type of the item image A, the timing, position, direction, speed, and the like at which the item image A moves.

The distribution moving image generating unit 27 performs, on the moving image supplied from the moving image acquisition unit 21, synthesis processing of synthesizing the character image C at a position according to the display control by the character display control unit 25, and synthesis processing of synthesizing the item image A at a position according to the display control by the item display control unit 26. As a result, the distribution moving image generating unit 27 generates a distribution moving image synthesized so that the character image C and the item image A are superimposed on the moving image, and transmits the distribution moving image to the performer side information processing device 15 and the viewer side information processing device 14 via the network 12.

In a case where the character image C moves from the distribution moving image display area 17 to the outer area 18 in accordance with the instruction from the character display control unit 25, the display control information generating unit 28 generates display control information necessary for causing the character image C to be displayed interlockingly before and after the movement. Similarly, in a case where the item image A moves from the distribution moving image display area 17 to the outer area 18 in accordance with the instruction from the item display control unit 26, the display control information generating unit 28 generates display control information necessary for causing the item image A to be displayed interlockingly before and after the movement. Then, the display control information generating unit 28 transmits the display control information thus generated to the performer side information processing device 15 and the viewer side information processing device 14 via the network 12.

In addition, the display control information output from the display control information generating unit 28 is also supplied to the event information acquisition unit 22 (feedback loop). The event information acquisition unit 22 supplies the display control information output from the display control information generating unit 28 to the character display control unit 25 or the item display control unit 26, and the character display control unit 25 or the item display control unit 26 can cause the control information to be reflected on, for example, display of the character image C and the item image A in the next frame of the sequentially supplied moving image (when performing the next processing on the moving image).

As described above, by feeding back the display control information to the event information acquisition unit 22, it is possible to move the character image C and the item image A (animation) of the distribution moving image displayed in the distribution moving image display area 17 synchronously with the outer area 18 at the same time. Further, for example, it is possible to change the display control by the character display control unit 25 or the item display control unit 26 corresponding to the content of the event information to be acquired next by the event information acquisition unit 22 on the basis of the display control information fed back. In addition, the display control by the character display control unit 25 or the item display control unit 26 corresponding to the next analysis result by the performer analysis unit 23 may be changed on the basis of the display control information fed back.

The distribution server 13 is configured as described above, and can distribute the distribution moving image in which the character image C and the item image A are displayed interlockingly before and after the movement between the distribution moving image display area 17 and the outer area 18 in accordance with the event information.

Figure 4:
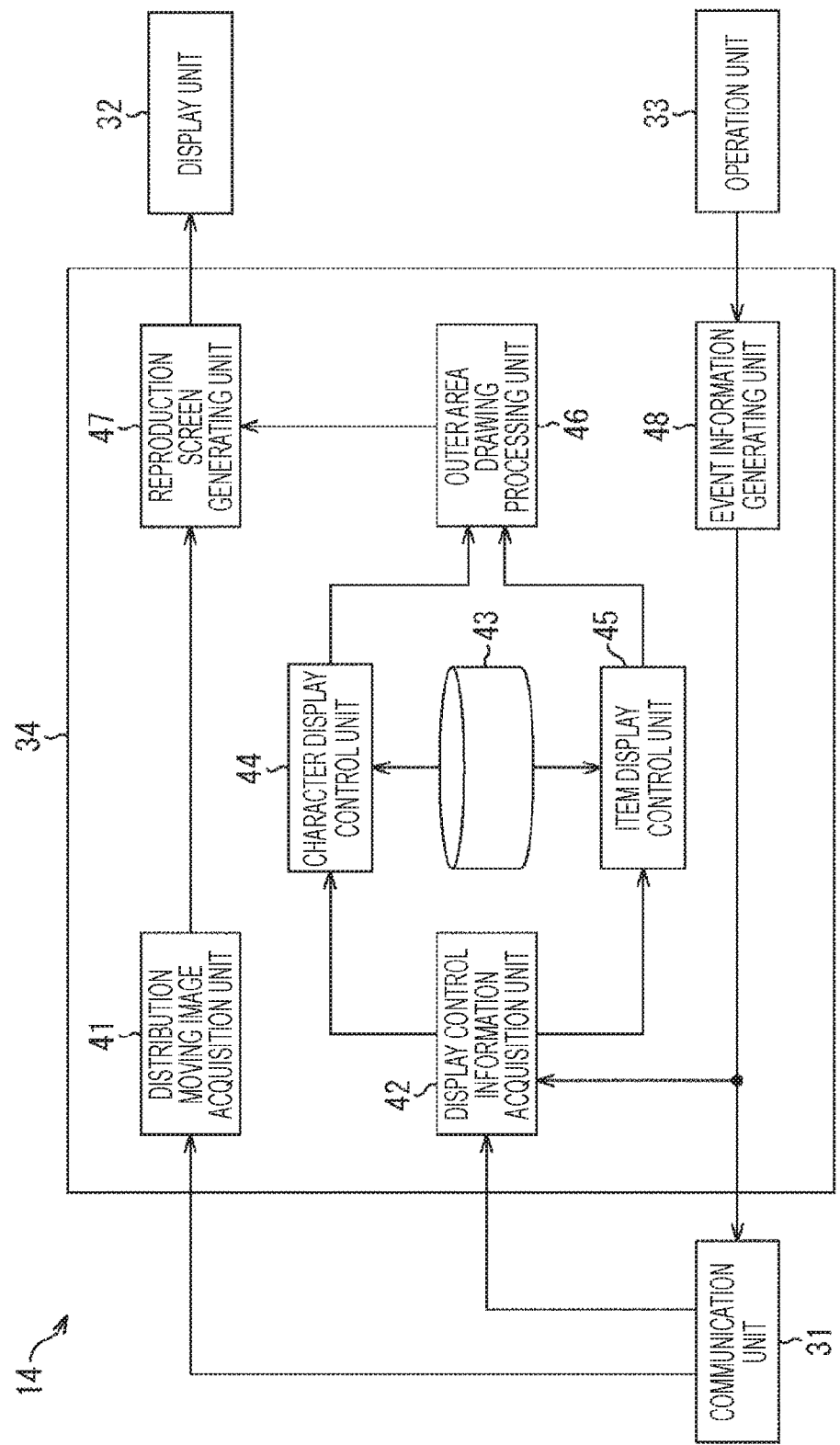
FIG. 4 is a block diagram illustrating a configuration example of a viewer side information processing device.

Next, FIG. 4 is a block diagram illustrating a configuration example of the viewer side information processing device 14 in FIG. 1.

As illustrated in FIG. 4, the viewer side information processing device 14 includes a communication unit 31, a display unit 32, an operation unit 33, and a distribution moving image processing unit 34.

The communication unit 31 is capable of performing communication conforming to a predetermined communication standard such as the Internet, for example, and communicates with the distribution server 13 via the network 12 in FIG. 1.

The display unit 32 includes, for example, a liquid crystal display, an organic electro luminescence (EL) display, and the like, and displays the distribution moving image reproduction screen 16 as illustrated in FIG. 2 in accordance with the image data output from the distribution moving image processing unit 34.

The operation unit 33 includes, for example, various buttons, a touch screen, and the like, receives operation by the viewer of the viewer side information processing device 14, and supplies operation information indicating the content of the operation to the distribution moving image processing unit 34. For example, the viewer can perform touch operation on a button image (a GUI for instructing occurrences of various events as described later) displayed on the touch screen, drag operation on the character image C displayed on the touch screen, and the like.

The distribution moving image processing unit 34 includes a distribution moving image acquisition unit 41, a display control information acquisition unit 42, a storage unit 43, a character display control unit 44, an item display control unit 45, an outer area drawing processing unit 46, a reproduction screen generating unit 47, and an event information generating unit 48.

The distribution moving image acquisition unit 41 acquires the distribution moving image distributed from the distribution server 13 via the network 12, and supplies the distribution moving image to the reproduction screen generating unit 47.

The display control information acquisition unit 42 acquires the display control information distributed from the distribution server 13 via the network 12. Then, the display control information acquisition unit 42 supplies the display control information to the character display control unit 44 or the item display control unit 45 as appropriate in accordance with the content of the display control information. The display control information includes information necessary for performing display interlockingly when the character image C or the item image A moves from the distribution moving image display area 17 to the outer area 18 before and after the movement. In addition, when the event information is supplied from the event information generating unit 48, the display control information acquisition unit 42 supplies the event information as appropriate to the character display control unit 44 or the item display control unit 45 in accordance with the content of the event information.

The storage unit 43 stores various images such as the character image C caused to be displayed in the outer area 18 by the character display control unit 44, and the item image A caused to be displayed in the outer area 18 by the item display control unit 45.

The character display control unit 44 controls display of the character image C displayed in the outer area 18 in accordance with the display control information or the event information supplied from the display control information acquisition unit 42. For example, in a case where the character image C moves from the distribution moving image display area 17 to the outer area 18, the character display control unit 44 first reads the character image C from the storage unit 43 on the basis of the display control information. Then, the character display control unit 44 performs display control of the character image C in the outer area 18 so that the display is performed interlockingly with the distribution moving image display area 17 in accordance with the display control information. In addition, the item display control unit 45 performs display control of the character image C in the outer area 18 in accordance with the event information depending on the operation of the viewer.

The item display control unit 45 controls display of the item image A displayed in the outer area 18 in accordance with the display control information or the event information supplied from the display control information acquisition unit 42. For example, in a case where the item image A moves from the distribution moving image display area 17 to the outer area 18, the item display control unit 45 first reads the item image A from the storage unit 43 on the basis of the display control information. Then, the item display control unit 45 performs display control of the item image A in the outer area 18 so that the display is performed interlockingly with the distribution moving image display area 17 in accordance with the display control information. In addition, the item display control unit 45 performs display control of the item image A in the outer area 18 in accordance with the event information depending on the operation of the viewer.

The outer area drawing processing unit 46 performs, in the outer area 18, drawing processing of drawing the character image C at a position according to the display control by the character display control unit 44, and drawing processing of drawing the item image A at a position according to the display control by the item display control unit 45. Then, the outer area drawing processing unit 46 supplies the outer area 18 in which the character image C and the item image A are drawn to the reproduction screen generating unit 47.

The reproduction screen generating unit 47 generates the distribution moving image reproduction screen 16 that displays the distribution moving image supplied from the distribution moving image acquisition unit 41 in the distribution moving image display area 17, and displays the outer area 18 outside the distribution moving image display area 17. Then, the reproduction screen generating unit 47 supplies image data for displaying the distribution moving image reproduction screen 16 to the display unit 32 to cause the image data to be displayed.

When the operation information of the operation performed on the operation unit 33 by the viewer of the viewer side information processing device 14 is supplied from the operation unit 33, the event information generating unit 48 generates event information corresponding to the operation. For example, in a case where the operation unit 33 includes a touch screen, and a button image for instructing occurrence of an event is translucently superimposed on the distribution moving image reproduction screen 16, when the operation unit 33 recognizes a touch on the button image, the event information generating unit 48 generates event information associated with the button image. Then, the event information generating unit 48 causes the generated event information to be transmitted to the distribution server 13 and the performer side information processing device 15 via the communication unit 31, and also supplies the event information to the display control information acquisition unit 42.

The viewer side information processing device 14 is configured as described above, and can cause the character image C and the item image A to be displayed in the outer area 18 so that the character image C and the item image A are displayed interlockingly before and after the movement between the distribution moving image display area 17 and the outer area 18 in accordance with the display control information.

Figure 5:
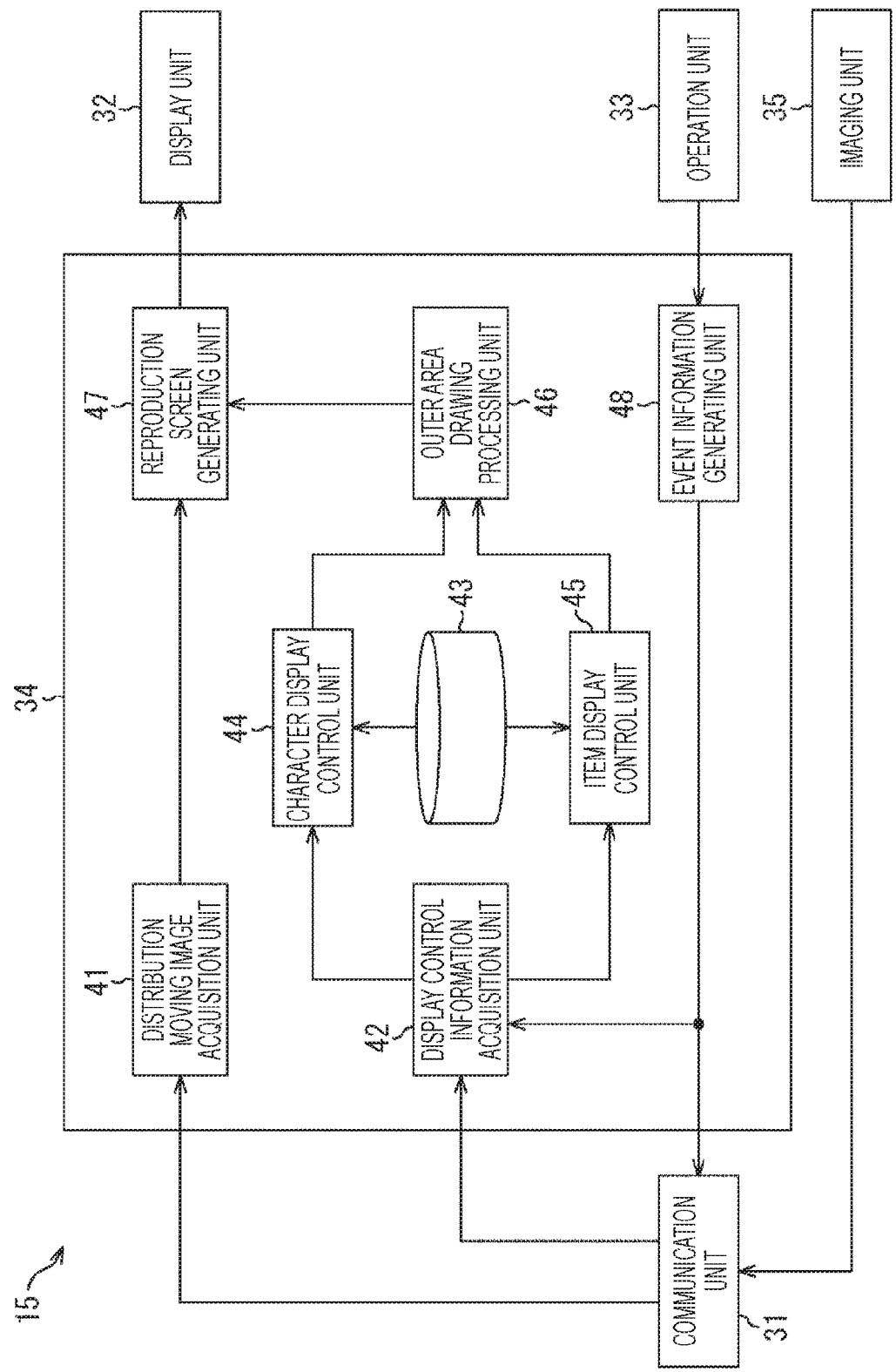
FIG. 5 is a block diagram illustrating a configuration example of a performer side information processing device.

Next, FIG. 5 is a block diagram illustrating a configuration example of the performer side information processing device 15 in FIG. 1. In the performer side information processing device 15 illustrated in FIG. 5, components common to those in the viewer side information processing device 14 in FIG. 4 are denoted by the same reference numerals, and a detailed description thereof will be omitted.

As illustrated in FIG. 5, the performer side information processing device 15 includes the communication unit 31, the display unit 32, the operation unit 33, and the distribution moving image processing unit 34, and in that point, the performer side information processing device 15 is set to have a common configuration to the viewer side information processing device 14 in FIG. 4. In addition, the configuration of the distribution moving image processing unit 34 of the performer side information processing device 15 is also set common to the distribution moving image processing unit 34 of FIG. 4.

Then, the performer side information processing device 15 transmits the moving image imaged by an imaging unit 35 with the user of the performer side information processing device 15 as a performer, to the distribution server 13 via the network 12 by the communication unit 31, and in that point, the performer side information processing device 15 is set to have a different configuration from the viewer side information processing device 14 in FIG. 4.

The imaging unit 35 includes, for example, a complementary metal oxide semiconductor (CMOS) image sensor or the like, images a user of the viewer side information processing device 14, and supplies to the communication unit 31 a moving image on which the user is projected as a performer.

The performer side information processing device 15 is configured as described above, and can transmit the moving image on which the performer is projected to the distribution server 13 via the network 12 by the communication unit 31. Then, similarly to the viewer side information processing device 14, the performer side information processing device 15 can cause the character image C and the item image A to be displayed in the outer area 18 so that the character image C and the item image A are displayed interlockingly before and after the movement between the distribution moving image display area 17 and the outer area 18.

Next, with reference to the distribution moving image reproduction screen 16 illustrated in FIGS. 6 to 16, examples will be described of events occurring in the moving image distribution service provided by the moving image distribution system 11.

Figure 6:
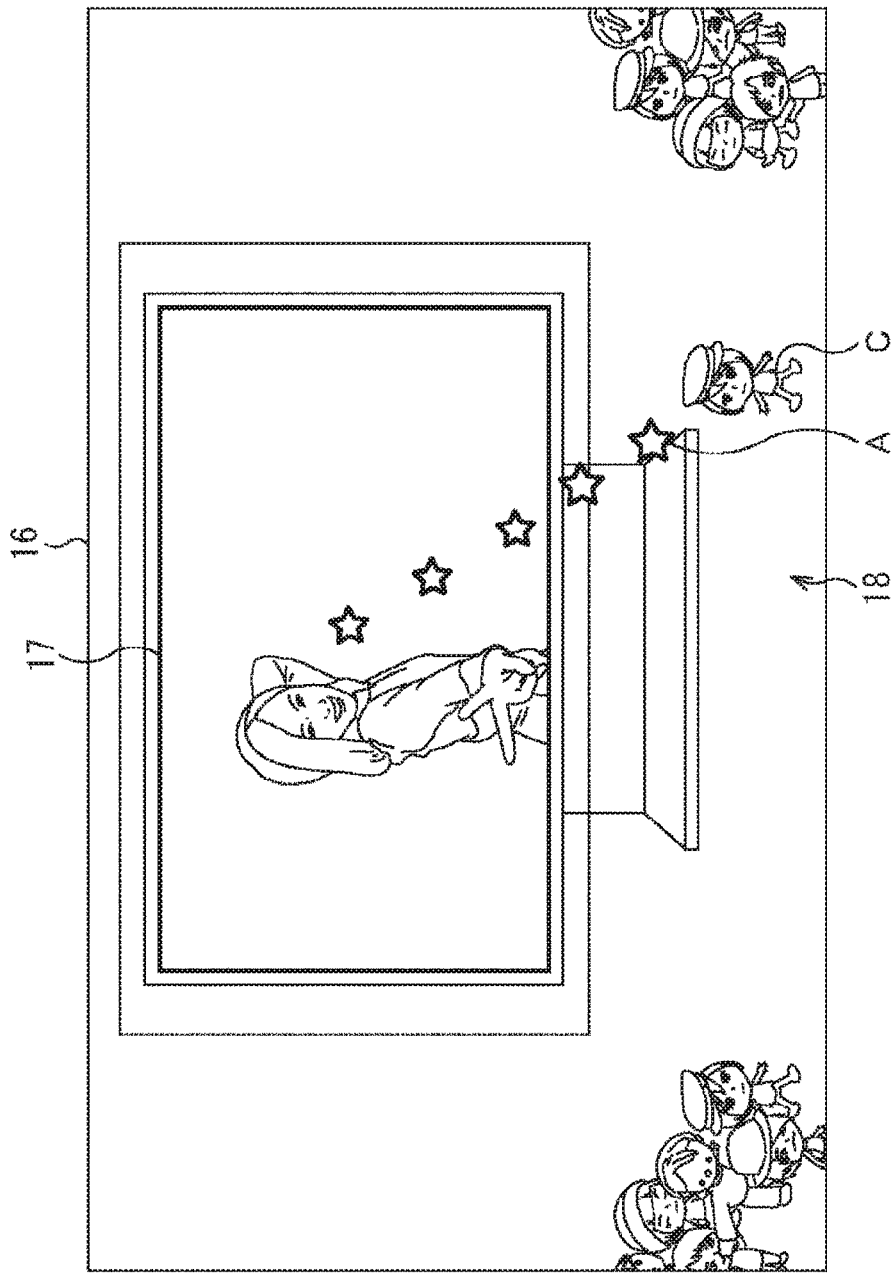
FIG. 6 is a diagram illustrating an interactive display in a first event.

With reference to FIG. 6, an interactive display in a first event will be described.

As illustrated in FIG. 6, in the first event, interactive display is performed in which the character image C displayed in the outer area 18 throws the item image A toward the performer projected on the distribution moving image in the distribution moving image display area 17.

For example, when operation for generating the first event is performed on the operation unit 33 in the viewer side information processing device 14, the event information generating unit 48 generates event information according to the operation and supplies the event information to the display control information acquisition unit 42. The display control information acquisition unit 42 supplies the event information to the item display control unit 45 in accordance with the content of the event information (throw the item image A), and the item display control unit 45 controls display of the item image A in the outer area 18. As a result, the item image A is displayed so as to appear near the character image C displayed in the outer area 18 and move toward the distribution moving image display area 17.

Further, the event information generating unit 48 causes similar event information to be transmitted to the distribution server 13 via the communication unit 31. In the distribution server 13, the event information acquisition unit 22 supplies the event information to the item display control unit 26 in accordance with the content of the event information (throw the item image A). Then, the item display control unit 26 controls display of the item image A superimposed on the moving image in accordance with information included in the event information, for example, information indicating the type of the item image A, and the timing, position, direction, speed, and the like at which the item image A moves from the outer area 18 to the distribution moving image display area 17.

Therefore, in the outer area 18 of the distribution moving image reproduction screen 16, the display of the item image A is controlled by the item display control unit 45 of the viewer side information processing device 14, and in the distribution moving image display area 17 of the distribution moving image reproduction screen 16, the display of the item image A is controlled by the item display control unit 26 of the distribution server 13. That is, when the item image A moving from the character image C toward the distribution moving image display area 17 reaches the outer edge of the distribution moving image display area 17, the item image A in the outer area 18 is hidden. At that timing, display is performed in which the item image A is displayed on the inner edge of the distribution moving image display area 17 along a moving direction of the item image A in the outer area 18, and the item image A continues to move and reaches the performer.

As described above, in the first event, interactive display is performed in which the movement of the item image A is displayed interlockingly so as to be a contiguous locus between the outer area 18 and the distribution moving image display area 17 so that the item image A thrown from the character image C reaches the performer. As a result, the moving image distribution system 11 can provide a moving image distribution service having higher interactivity that further improves the sense of unity of performers and viewers.

Figure 7:
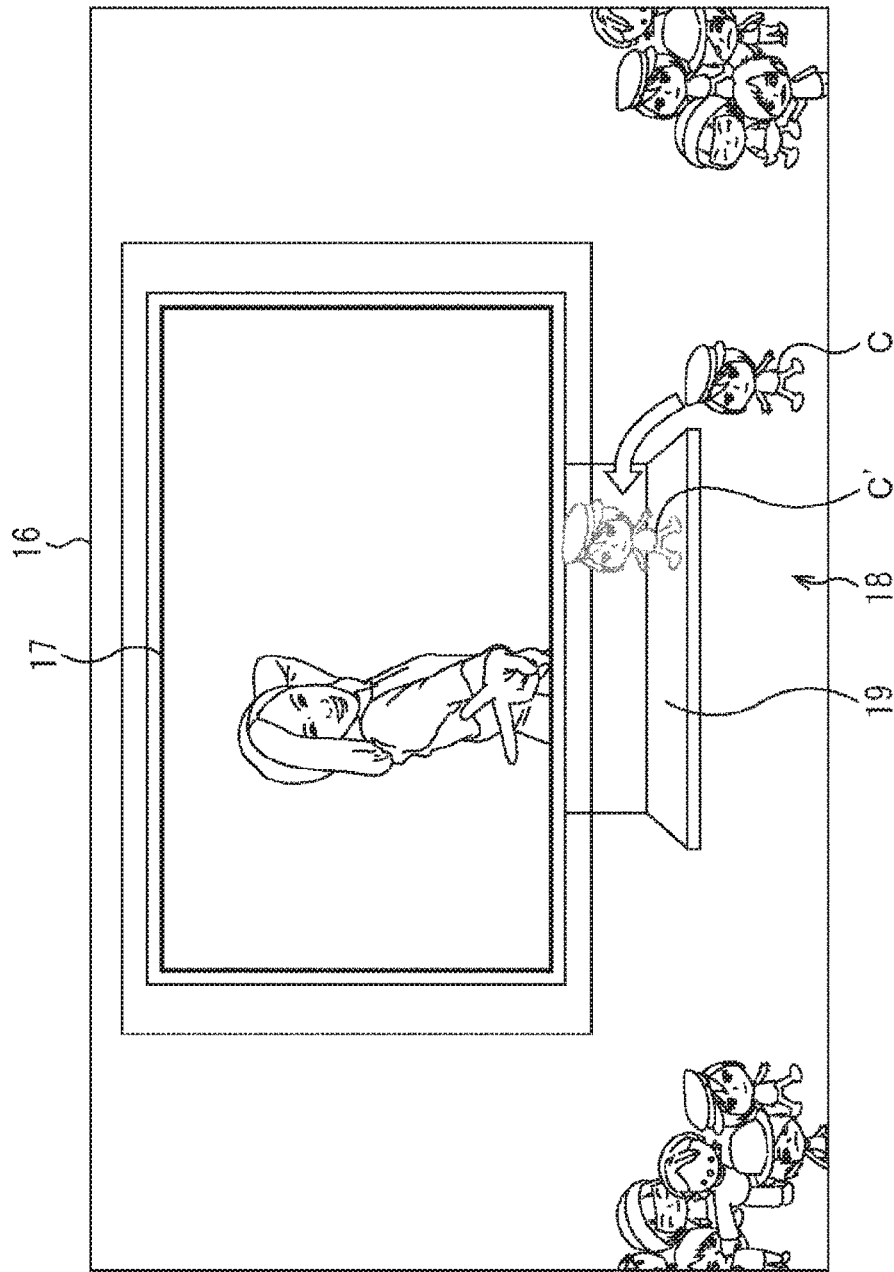
FIG. 7 is a diagram illustrating an interactive display in a second event.
Figure 8:
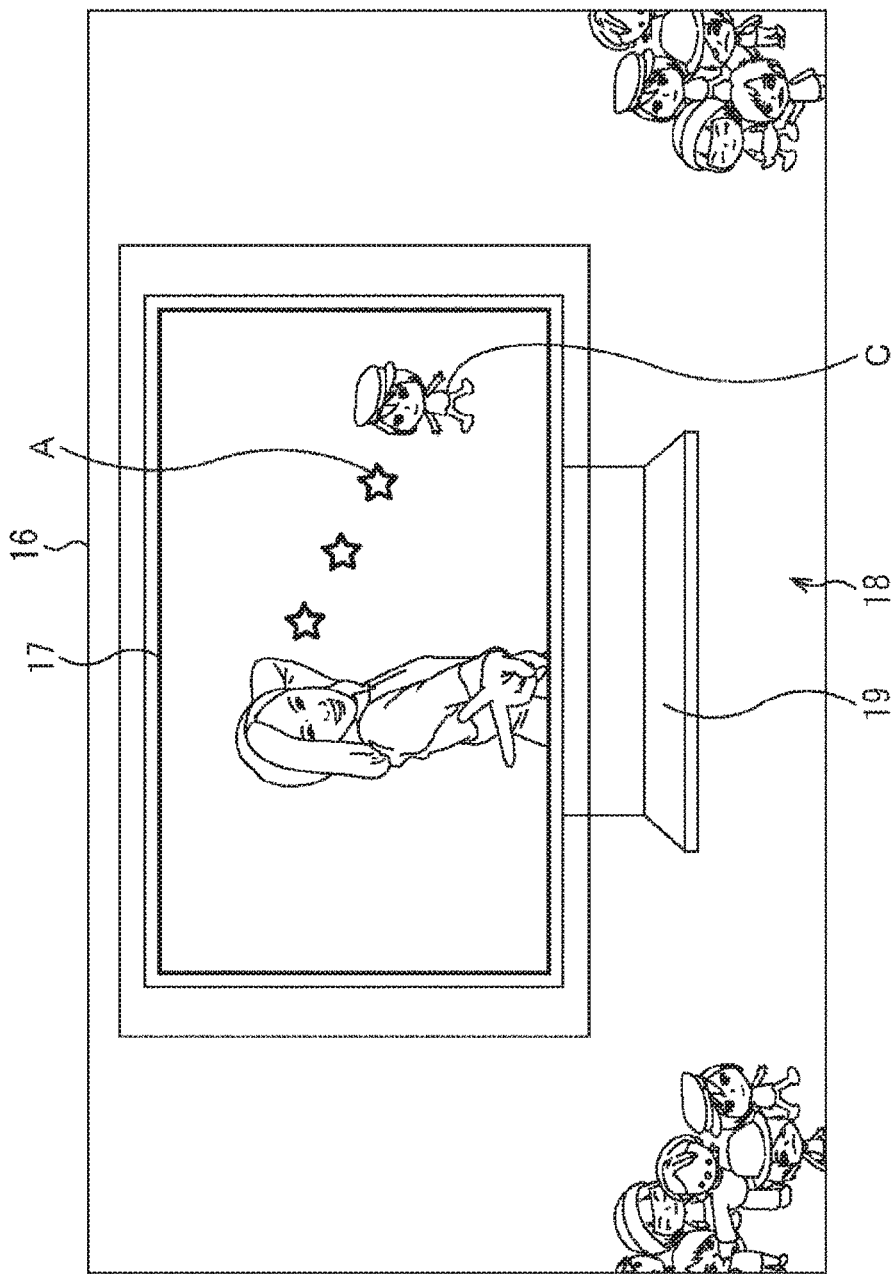
FIG. 8 is a diagram illustrating an interactive display in the second event.

With reference to FIGS. 7 and 8, an interactive display in a second event will be described.

As illustrated in FIGS. 7 and 8, in the second event, interactive display is performed in which the character image C displayed in the outer area 18 moves to the distribution moving image display area 17 and then throws the item image A toward the performer.

For example, when operation for generating the second event is performed on the operation unit 33 in the viewer side information processing device 14, the event information generating unit 48 generates event information according to the operation and supplies the event information to the display control information acquisition unit 42. The display control information acquisition unit 42 supplies the event information to the character display control unit 44 in accordance with the content of the event information (the character image C moves). The character display control unit 44 controls the display so that the character image C is caused to move to a predetermined position in the outer area 18, and then the character image C jumps to move onto a stand 19 displayed below the distribution moving image display area 17 in the example of FIG. 7, and then a character image C' fades out and disappears.

Further, the event information generating unit 48 causes similar event information to be transmitted to the distribution server 13 via the communication unit 31. In the distribution server 13, the event information acquisition unit 22 supplies the event information to the character display control unit 25 in accordance with the content of the event information (the character image C moves). Then, immediately after the timing when the character image C' on the stand 19 disappears, the character display control unit 25 controls display of the character image C so that a distribution moving image is generated on which the character image C is superimposed, as illustrated in FIG. 8. At this time, the character display control unit 25 causes the character image C to be displayed so that the character image C does not overlap the performer in accordance with the performer display position information supplied from the performer analysis unit 23. Further, the item display control unit 26 controls the display of the item image A so that a rendition is performed in which the character image C superimposed on the moving image throws the item image A to the performer.

Then, after the item image A thrown from the character image C reaches the performer, the character display control unit 25 controls the display so that the character image C fades out and disappears. At this time, the character display control unit 25 instructs the display control information generating unit 28 that the character image C disappears from the distribution moving image display area 17. In accordance with the instruction, the display control information generating unit 28 generates display control information indicating that display control is performed in which the character image C is displayed at the original position, and transmits the display control information to the viewer side information processing device 14 via the network 12.

Thereafter, in the viewer side information processing device 14, the display control information acquisition unit 42 acquires the display control information and supplies the display control information to the character display control unit 44, and the character display control unit 44 performs control for displaying the character image C at the original display position of the character image C illustrated in FIG. 7.

As described above, in the second event, interactive display is performed in which the character image C is hidden after jumping to the stand 19, and the character image C is displayed interlockingly between the outer area 18 and the distribution moving image display area 17 so that the character image C appears at an arbitrary position other than the display position of the performer in the distribution moving image display area 17 at the timing when the character image C is hidden. Further, interactive display is performed in which the rendition is ended of delivering the item image A to the performer by the character image C, and then the character image C of the distribution moving image display area 17 is hidden, and the character image C is displayed at the original display position in the outer area 18. As a result, the moving image distribution system 11 can provide a moving image distribution service having higher interactivity that further improves the sense of unity of performers and viewers.

Note that, for example, interactive display can be performed in which the character image C returns to the outer area 18, by detecting a motion performed on the character image C by the performer (for example, a motion of pushing out the character image C by hand) on the basis of the performer display position information supplied from the performer analysis unit 23. In addition, for example, a rendition can be performed in which a plurality of character images C may be moved into the distribution moving image display area 17, and the plurality of character images C can be displayed in the distribution moving image display area 17 until the number of the character images C reaches a predetermined number set in advance, and in a case where the number exceeds the predetermined number, the character image C is flicked out of the frame of the distribution moving image display area 17. In addition, only the character image C of the viewer performing specific operation may be displayed in the distribution moving image display area 17.

With reference to FIG. 9, an interactive display in a third event will be described.

As illustrated in FIG. 9, in the third event, interactive display is performed in which the item image A is delivered from the performer projected on the distribution moving image in the distribution moving image display area 17, toward the character image C displayed in the outer area 18.

For example, when a moving image imaged in a state in which a performer holds a panel on which a heart is drawn is transmitted from the performer side information processing device 15 to the distribution server 13, in the distribution server 13, the performer analysis unit 23 recognizes the panel held by the performer. Then, the performer analysis unit 23 generates event information associated with the panel and supplies the event information to the event information acquisition unit 22. For example, the panel on which the heart is drawn is associated with an event of delivering the heart-shaped item image A to a specific plurality of the character images C, and the example in FIG. 9 illustrates a situation in which a rendition is performed in which item images A1 to A6 are delivered to character images C1 to C6, respectively.

The event information acquisition unit 22 supplies the event information to the item display control unit 26 in accordance with the content of the event information (deliver the plurality of item images A to the specific plurality of character images C). Further, the event information acquisition unit 22 requests the viewer side information processing devices 14 of the viewers corresponding to the character images C1 to C6 to transmit positions of the character images C1 to C6 displayed in the outer area 18, and grasps the positions of the character images C1 to C6 and instructs the item display control unit 26 on the positions.

For example, the item display control unit 26 controls the display of the item images A1 to A6 so that the corresponding item images A1 to A6 move from the panel held by the performer toward the positions of the respective character images C1 to C6. Then, when the item images A1 to A6 reach the inner edge of the distribution moving image display area 17, the item display control unit 26 hides the item images A1 to A6 in the distribution moving image display area 17. At this time, the item display control unit 26 instructs the display control information generating unit 28 on the timing, position, direction, speed, and the like at which each of the item images A1 to A6 is hidden. In accordance with the instruction, the display control information generating unit 28 generates display control information including information necessary for causing the item images A1 to A6 to be displayed in the outer area 18 so that the item images A1 to A6 are displayed interlockingly between the distribution moving image display area 17 and the outer area 18. Then, the display control information generating unit 28 transmits the generated display control information to the viewer side information processing device 14 and the performer side information processing device 15 via the network 12.

In the viewer side information processing device 14 and the performer side information processing device 15, the display control information acquisition unit 42 acquires the display control information and supplies the display control information to the item display control unit 45. As a result, the item display control unit 45 controls the display so that the item images A1 to A6 are respectively displayed on the outer edges of the distribution moving image display area 17 along moving directions of the item images A1 to A6 in the distribution moving image display area 17, at the timing when each of the item images A1 to A6 is hidden in the distribution moving image display area 17, and the item images A1 to A6 continue to move and reach the respective character images C1 to C6.

As described above, in the third event, interactive display is performed in which movements of the item images A1 to A6 are displayed interlockingly so as to be contiguous loci between the distribution moving image display area 17 and the outer area 18 so that the item images A1 to A6 reach the respective character images C1 to C6 from the performer. As a result, the moving image distribution system 11 can provide a moving image distribution service having higher interactivity that further improves the sense of unity of performers and viewers.

Figure 10:
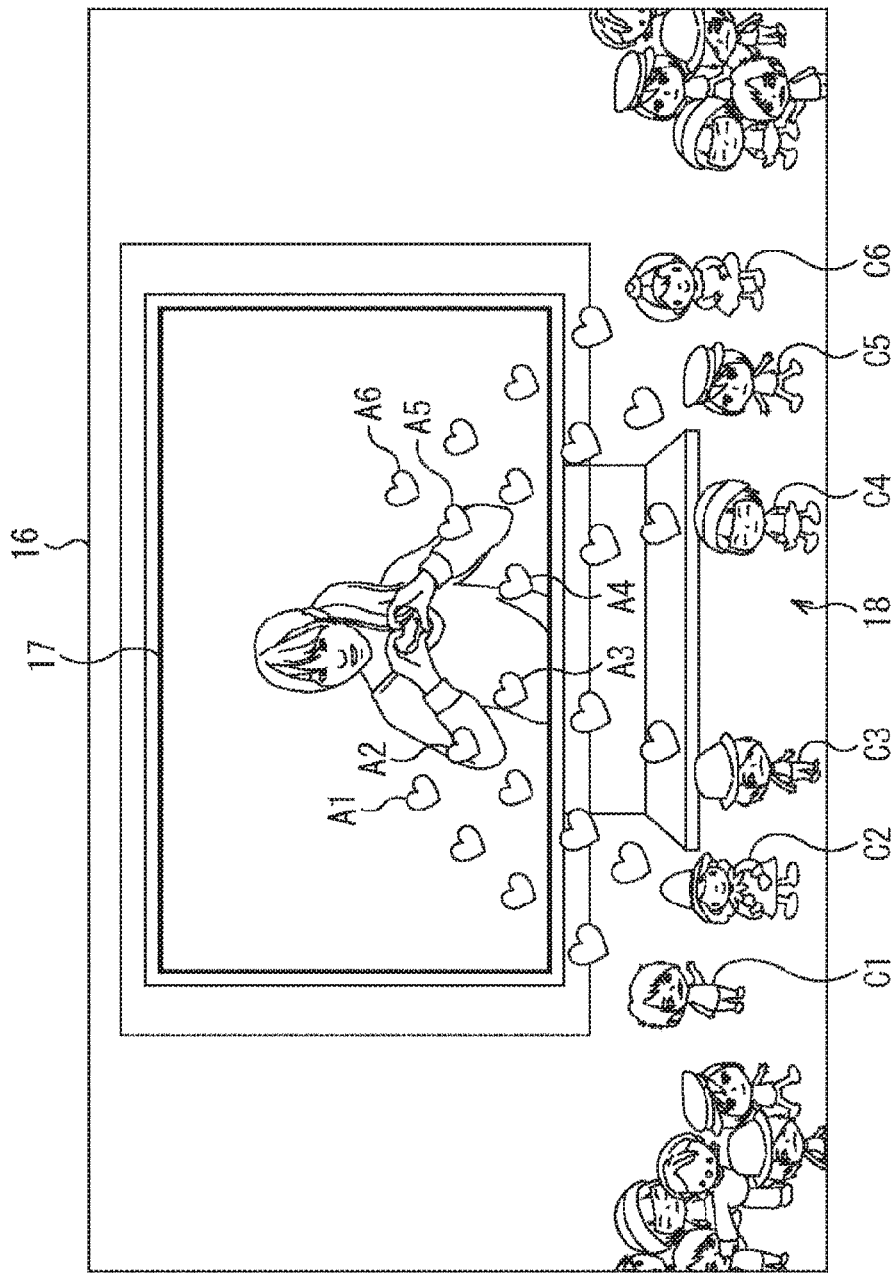
FIG. 10 is a diagram illustrating an interactive display in a fourth event.
Figure 11:
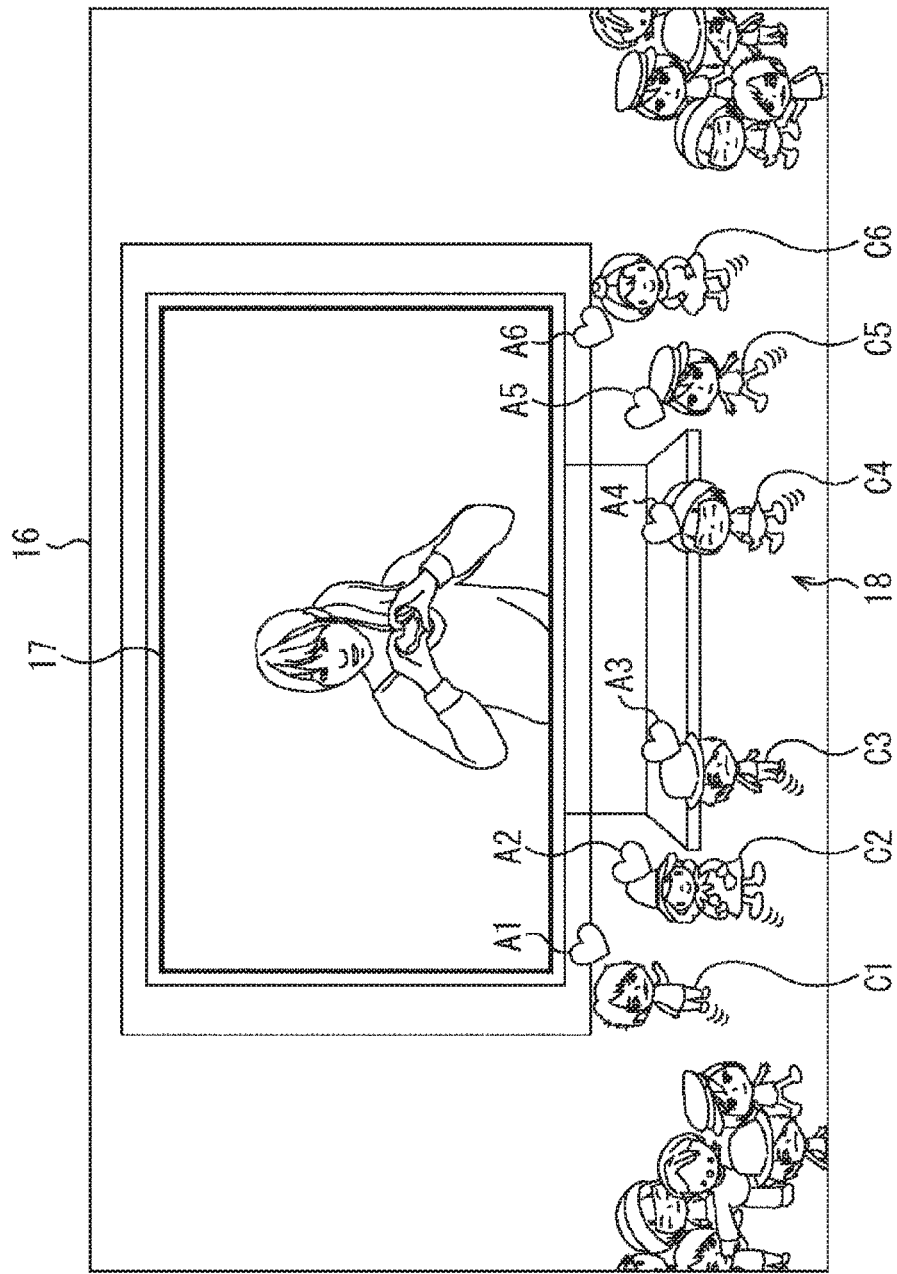
FIG. 11 is a diagram illustrating an interactive display in the fourth event.

With reference to FIGS. 10 and 11, an interactive display in a fourth event will be described.

In the fourth event, similarly to the third event, interactive display is performed in which the item image A is delivered from the performer projected on the distribution moving image in the distribution moving image display area 17, toward the character image C displayed in the outer area 18.

For example, when a moving image in which a performer performs a gesture to make a heart shape by hand is transmitted from the performer side information processing device 15 to the distribution server 13, in the distribution server 13, the performer analysis unit 23 recognizes the gesture of the performer. Then, the performer analysis unit 23 generates event information associated with the gesture and supplies the event information to the event information acquisition unit 22. For example, similarly to the third event described in FIG. 9, the gesture to make the heart shape by hand is associated with the event of delivering a heart-shaped item image A to a specific plurality of character images C.

Therefore, similarly to the description of FIG. 9, interactive display is performed in which movements of the item images A1 to A6 are displayed interlockingly so as to be contiguous loci between the distribution moving image display area 17 and the outer area 18 so that the item images A1 to A6 reach the respective character images C1 to C6 from the performer.

Further, in the fourth event, the viewers each can perform operation on the operation unit 33 for causing the corresponding character images C1 to C6 to jump and catch the respective item images A1 to A6, in accordance with the timing when the item images A1 to A6 reaches the respective character images C1 to C6. At this time, when the operation is performed in accordance with the timing when the item images A1 to A6 reach, the event information generating unit 48 generates event information indicating that the item images A1 to A6 are caused to be caught, and supplies the event information to the display control information acquisition unit 42. The display control information acquisition unit 42 supplies the event information to the character display control unit 44, and the character display control unit 44 controls the display so as to cause the character images C1 to C6 to jump and catch the respective item images A1 to A6 as illustrated in FIG. 11.

As described above, in the fourth event, interactive display is performed in which the item images A1 to A6 are caught delivered to the respective character images C1 to C6 from the performer. As a result, the moving image distribution system 11 can provide a moving image distribution service having higher interactivity that further improves the sense of unity of performers and viewers. Note that, for example, the panel as illustrated in FIG. 9 or the gesture as described with reference to FIGS. 10 and 11 or the like may be used as a trigger for event generation, and additionally, a design of a performer's clothing and a wearing object (for example, glasses) or the like may be used as a trigger for event generation. In addition, with these triggers, the content of the event generated by the performer may be changed. Further, depending on the combination of the character images C1 to C6, the content of the event generated by the performer may be changed.

Figure 12:
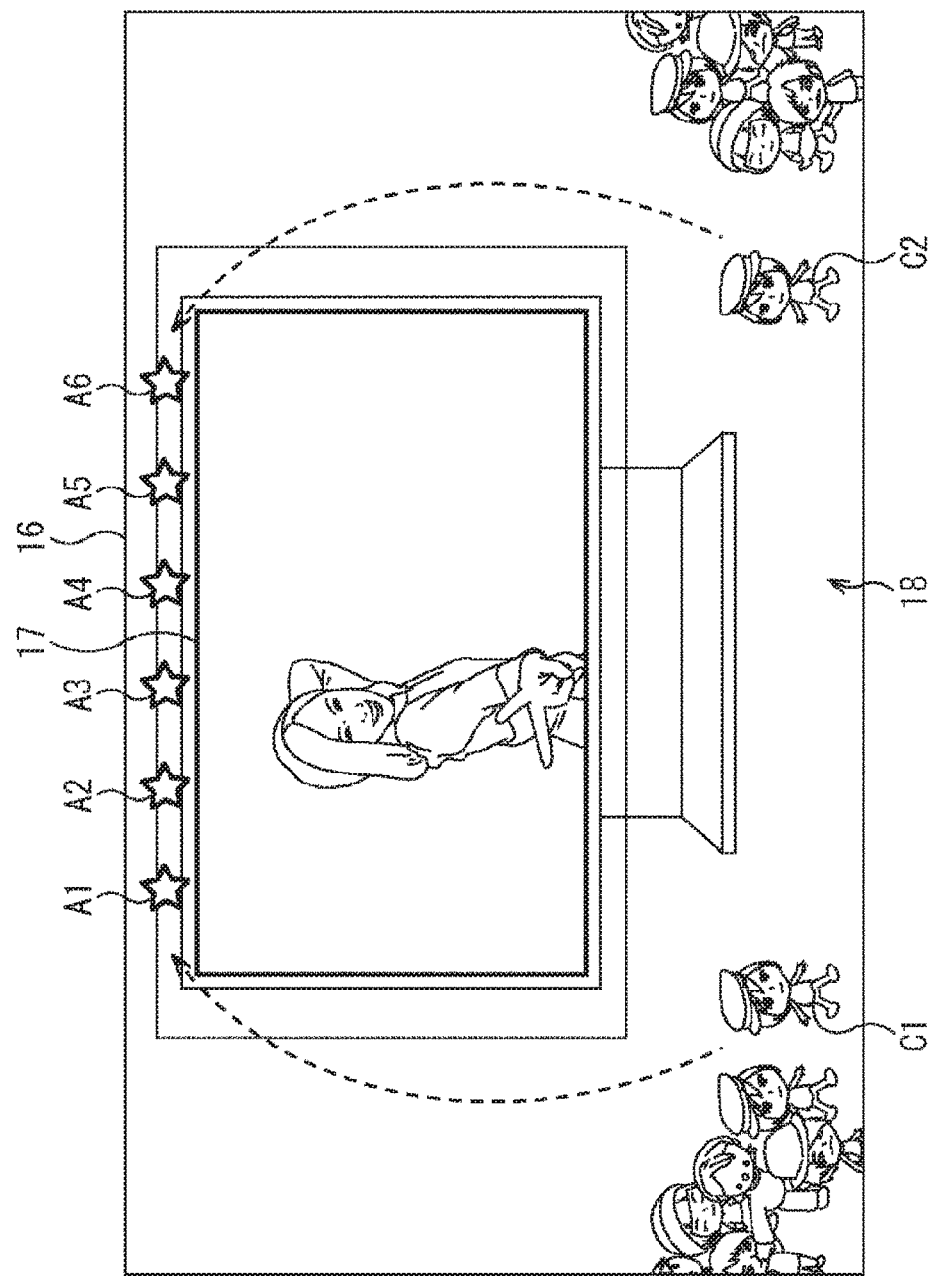
FIG. 12 is a diagram illustrating an interactive display in a fifth event.
Figure 13:
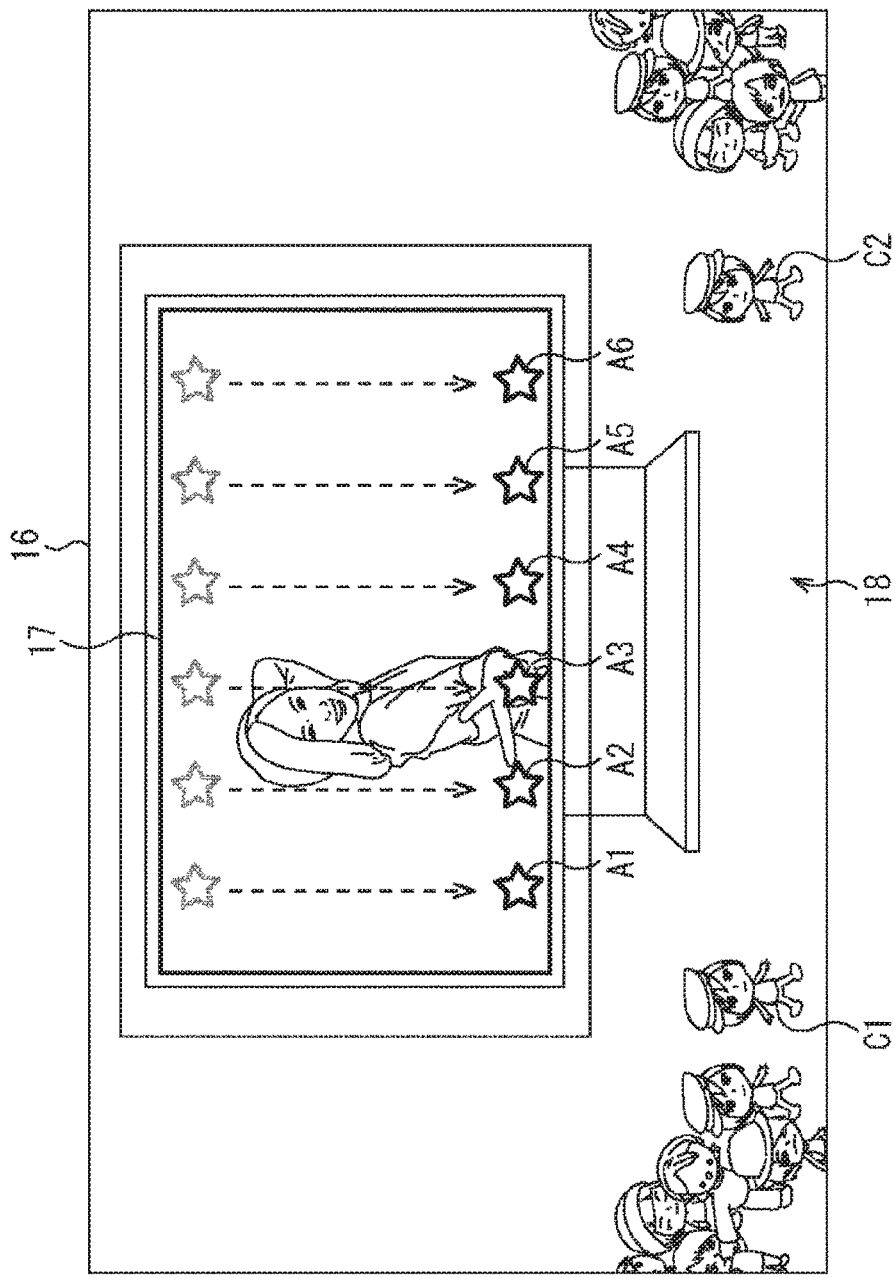
FIG. 13 is a diagram illustrating an interactive display in the fifth event.
Figure 14:
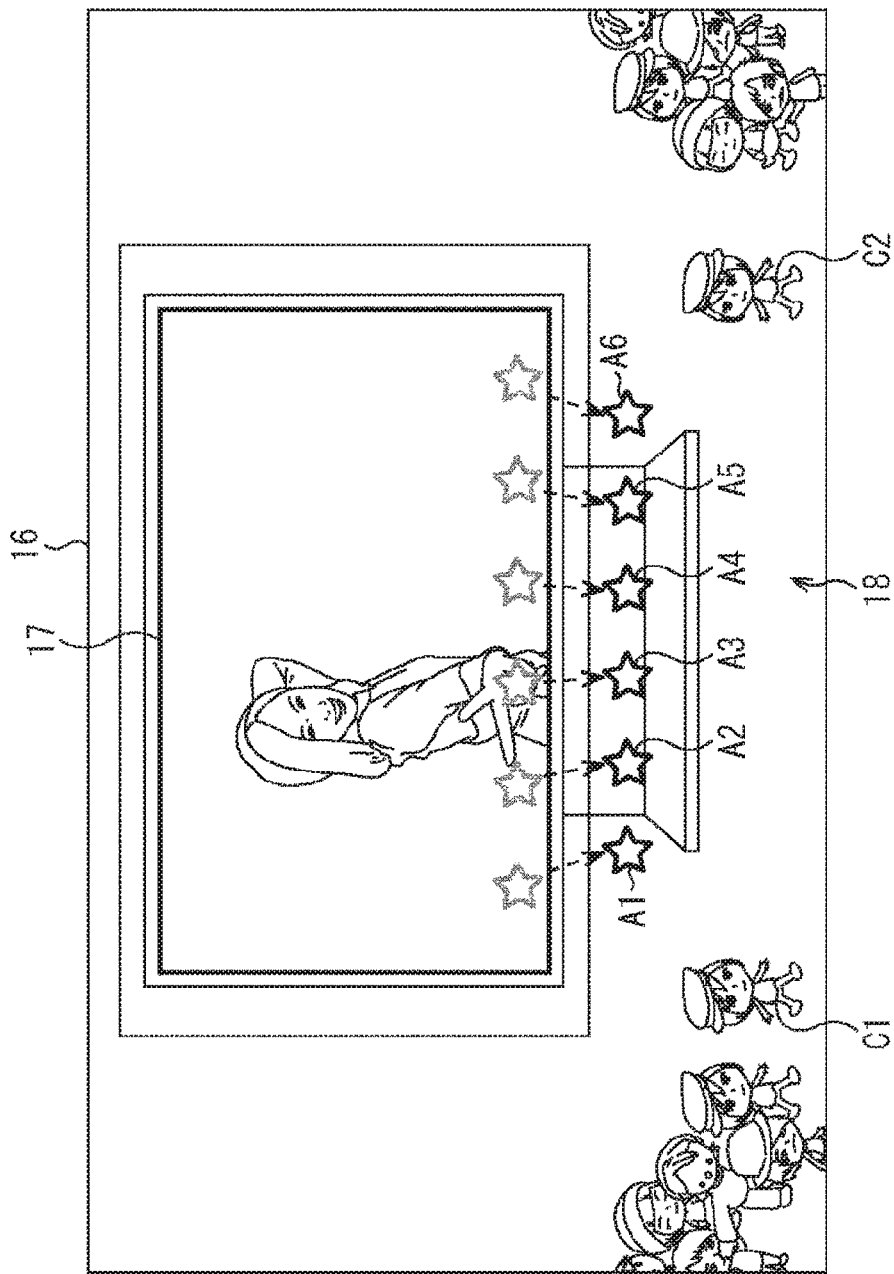
FIG. 14 is a diagram illustrating an interactive display in the fifth event.

With reference to FIGS. 12 to 14, an interactive display in a fifth event will be described.

As illustrated in FIGS. 12 to 14, in the fifth event, interactive display is performed in which the item image A thrown from the character image C in the outer area 18 passes through the distribution moving image display area 17 and returns to the outer area 18.

For example, when operation for generating the fifth event is performed on the operation unit 33 in the viewer side information processing device 14, the event information generating unit 48 generates event information according to the operation and supplies the event information to the display control information acquisition unit 42. The display control information acquisition unit 42 supplies the event information to the item display control unit 45 in accordance with the content of the event information (the item image A passes through the distribution moving image display area 17). In the example of FIG. 12, the item display control unit 45 controls the display so that the item images A1 to A6 thrown from the character images C1 and C2 are arranged on the upper side of the distribution moving image display area 17. Then, when the item images A1 to A6 move downward and reach the outer edge of the distribution moving image display area 17, the item display control unit 45 hides the item images A1 to A6 in the outer area 18.

Further, the event information generating unit 48 causes similar event information to be transmitted to the distribution server 13 via the communication unit 31. In the distribution server 13, the event information acquisition unit 22 supplies the event information to the item display control unit 26 in accordance with the content of the event information (the item image A passes through the distribution moving image display area 17). Then, immediately after the timing when the item images A1 to A6 are hidden, the item display control unit 26 controls the display of the item images A1 to A6 so that the item images A1 to A6 are displayed at the inner side from the upper side of the distribution moving image display area 17, as illustrated in FIG. 13.

Then, the item display control unit 26 controls the display of the item images A1 to A6 so that the item images A1 to A6 falls around the performer, and hides the item images A1 to A6 in the moving image display area 17 when the item images A1 to A6 reach the inner side from the lower side of the distribution moving image display area 17. At this time, although not illustrated, the item display control unit 26 may perform a rendition in which the item images A1 to A6 are scattered by hitting the performer in accordance with the performer display position information supplied from the performer analysis unit 23.

Further, the item display control unit 26 instructs the display control information generating unit 28 on the timing, position, direction, speed, and the like at which the item images A1 to A6 move so that the item images A1 to A6 move from the distribution moving image display area 17 to the outer area 18. In accordance with the instruction, the display control information generating unit 28 generates display control information indicating that display control is performed in which the item images A1 to A6 are displayed interlockingly in the outer area 18, and transmits the display control information to the viewer side information processing device 14 and the performer side information processing device 15 via the network 12.

As a result, as illustrated in FIG. 14, in the viewer side information processing device 14 and the performer side information processing device 15, the display control information acquisition unit 42 acquires the display control information and supplies the display control information to the item display control unit 45, and the item display control unit 45 controls the display of the item images A1 to A6 so that the item images A1 to A6 move to a predetermined position in the outer area 18.

As described above, in the fifth event, interactive display is performed in which movements of the item images A1 to A6 are displayed interlockingly so as to be contiguous loci when the item images A1 to A6 move from the outer area 18 to the distribution moving image display area 17, on the upper edge of the distribution moving image display area 17. Further, interactive display is performed in which movements of the item images A1 to A6 are displayed interlockingly so as to be continuous loci when the item images A1 to A6 move from the distribution moving image display area 17 to the outer area 18, on the lower edge of the distribution moving image display area 17, after the item images A1 to A6 passes through the distribution moving image display area 17. As a result, the moving image distribution system 11 can provide a moving image distribution service having higher interactivity that further improves the sense of unity of performers and viewers.

Figure 15:
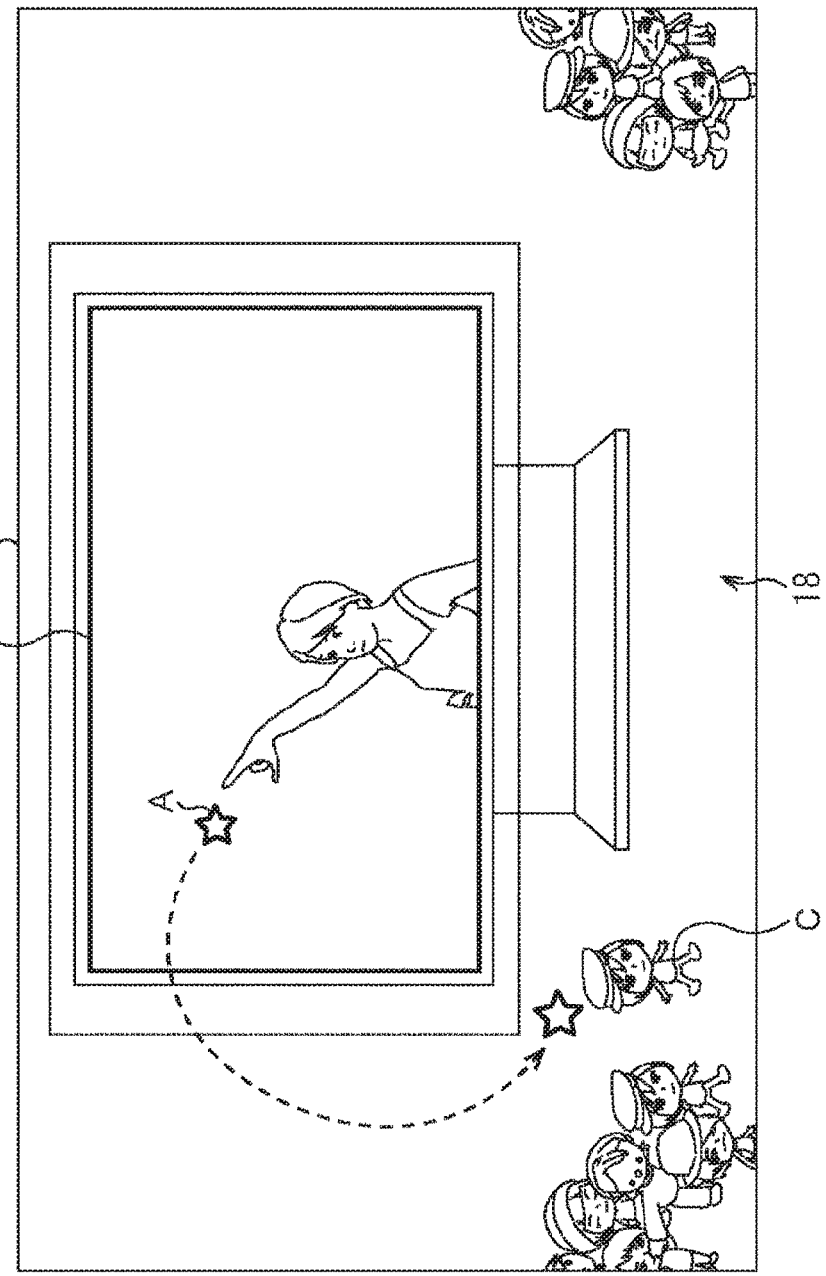
FIG. 15 is a diagram illustrating an interactive display in a sixth event.
Figure 16:
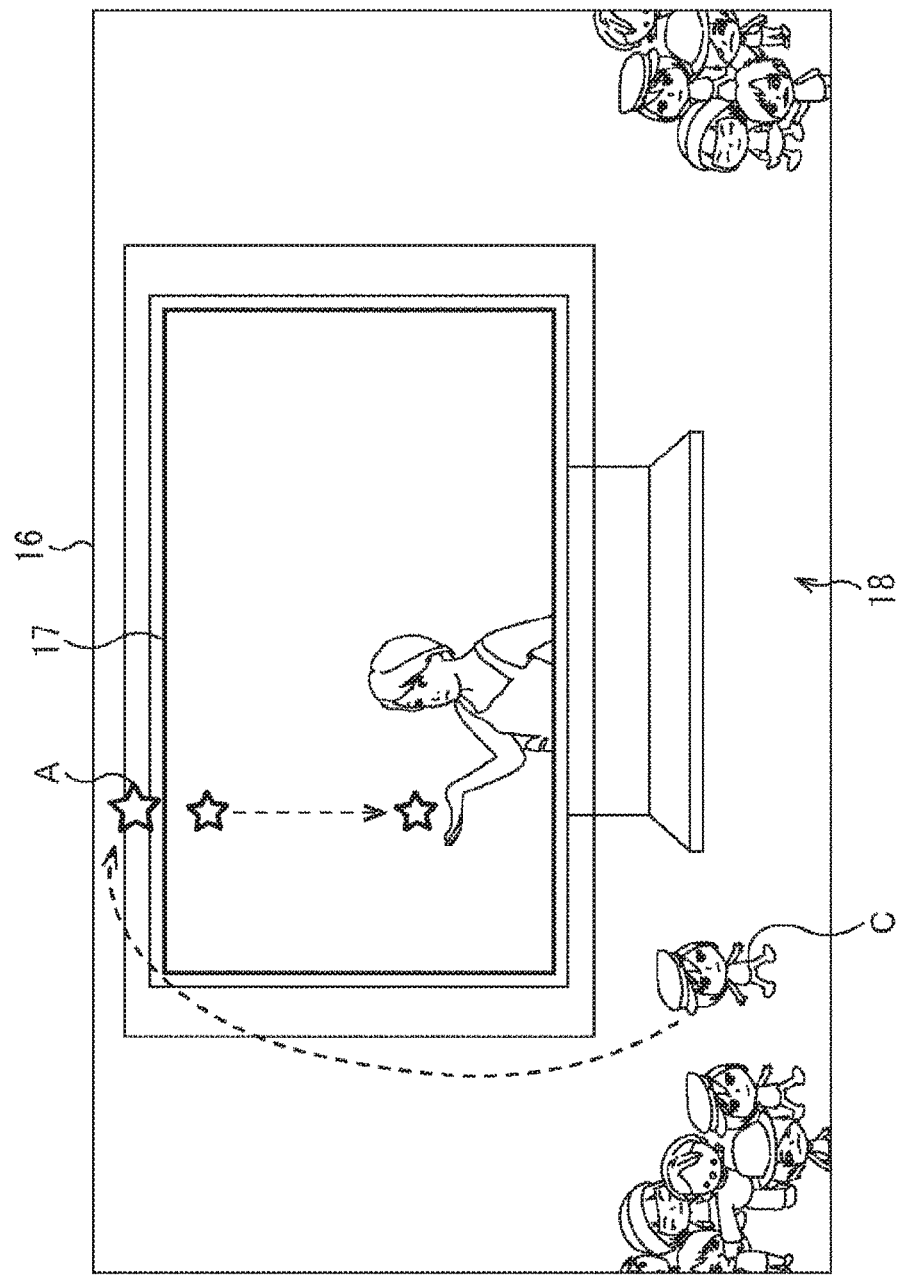
FIG. 16 is a diagram illustrating an interactive display in the sixth event.

With reference to FIGS. 15 and 16, an interactive display in a sixth event will be described.

As illustrated in FIGS. 15 and 16, in the sixth event, interactive display is performed in which the item image A is thrown toward the character image C from the performer projected on the distribution moving image, and the item image A returns to the performer via the character image C.

For example, in the performer side information processing device 15, when the performer specifies the item image A and performs operation on the operation unit 33 for generating the sixth event, the event information generating unit 48 generates event information according to the operation and transmits the event information to the distribution server 13 via the communication unit 31.

In the distribution server 13, the event information acquisition unit 22 acquires the event information and supplies the event information to the item display control unit 26. The item display control unit 26 controls the display of the item image A so that the item image A is thrown from the hand of the performer on the basis of the analysis result obtained by analyzing the position of the performer by the performer analysis unit 23. Then, the item display control unit 26 controls the display of the item image A so that the item image A is caused to move toward the outside of the distribution moving image display area 17 and disappears from the distribution moving image display area 17.

Further, the item display control unit 26 instructs the display control information generating unit 28 on the timing, position, direction, speed, and the like at which the item image A is hidden. In accordance with the instruction, the display control information generating unit 28 generates display control information including information necessary for causing the item image A to be displayed in the outer area 18 so that the item image A is displayed interlockingly between the distribution moving image display area 17 and the outer area 18. Then, the display control information generating unit 28 transmits the generated display control information to the viewer side information processing device 14 and the performer side information processing device 15 via the network 12.

In the viewer side information processing device 14 and the performer side information processing device 15, the display control information acquisition unit 42 acquires the display control information and supplies the display control information to the item display control unit 45. In accordance with the display control information, the item display control unit 45 controls the display of the item image A so that the item image A is displayed interlockingly in the outer area 18 from the display in the distribution moving image display area 17, and controls the display of the item image A so that the item image A moves toward the character image C.

Thereafter, for example, in the viewer side information processing device 14, when the viewer performs operation on the operation unit 33 for causing the character image C to catch the item image A and to throw the item image A back, the event information generating unit 48 generates event information according to the operation and supplies the event information to the display control information acquisition unit 42. The display control information acquisition unit 42 supplies the event information to the item display control unit 45 in accordance with the content of the event information.

As a result, as illustrated in FIG. 16, the item display control unit 45 controls the display of the item image A so that the item image A moves to a predetermined position on the upper edge of the distribution moving image display area 17. Then, when the item image A reaches a predetermined position of the outer side from the upper edge of the distribution moving image display area 17, the item display control unit 45 hides the item image A in the outer area 18.

In addition, the event information generating unit 48 transmits the generated event information to the distribution server 13 via the communication unit 31, and in the distribution server 13, the event information acquisition unit 22 acquires the event information and supplies the event information to the item display control unit 26. In accordance with the event information, the item display control unit 26 controls the display of the item image A so that processing is caused to be on standby until the timing when the item image A is hidden in the outer area 18, and when the timing comes, the item image A moves downward from a predetermined position of the inner side from the upper side of the distribution moving image display area 17.

At this time, for example, in a case where the fact that there is a performer's hand in a moving direction of the item image A is supplied to the item display control unit 26 as the analysis result by the performer analysis unit 23, the item display control unit 26 can control the display so that the item image A stops with the palm of the hand. Note that, the effect of the interactive display can be changed in accordance with the type of the item image A, in addition to the star-shaped item image A as illustrated in the figure. For example, in a case where the item image A is a ball, it is possible to render an effect that the performer and the character image C play catch.

As described above, in the sixth event, interactive display is performed in which the movement of the item image A is displayed interlockingly so as to be a contiguous locus between the distribution moving image display area 17 and the outer area 18 so that the item image A reaches the character image C from the performer. Further, interactive display is performed in which the movement of the item image A is displayed interlockingly so as to be a contiguous locus between the distribution moving image display area 17 and the outer area 18 so that the item image A is returned from the character image C toward the performer. As a result, the moving image distribution system 11 can provide a moving image distribution service having higher interactivity that further improves the sense of unity of performers and viewers.

Note that, as described above, in the moving image distribution system 11, in addition to providing a moving image distribution service in which one distribution moving image display area 17 is displayed on the distribution moving image reproduction screen 16, a moving image distribution service can be provided in which a plurality of distribution moving image display areas 17 is displayed on the distribution moving image reproduction screen 16. In this case, in addition to interactive display in which the item image A and the character image C are displayed interlockingly between the outer area 18 and the distribution moving image display area 17, interactive display can be performed in which the item image A and the character image C are displayed interlockingly between the plurality of distribution moving image display areas 17.

Figure 17:
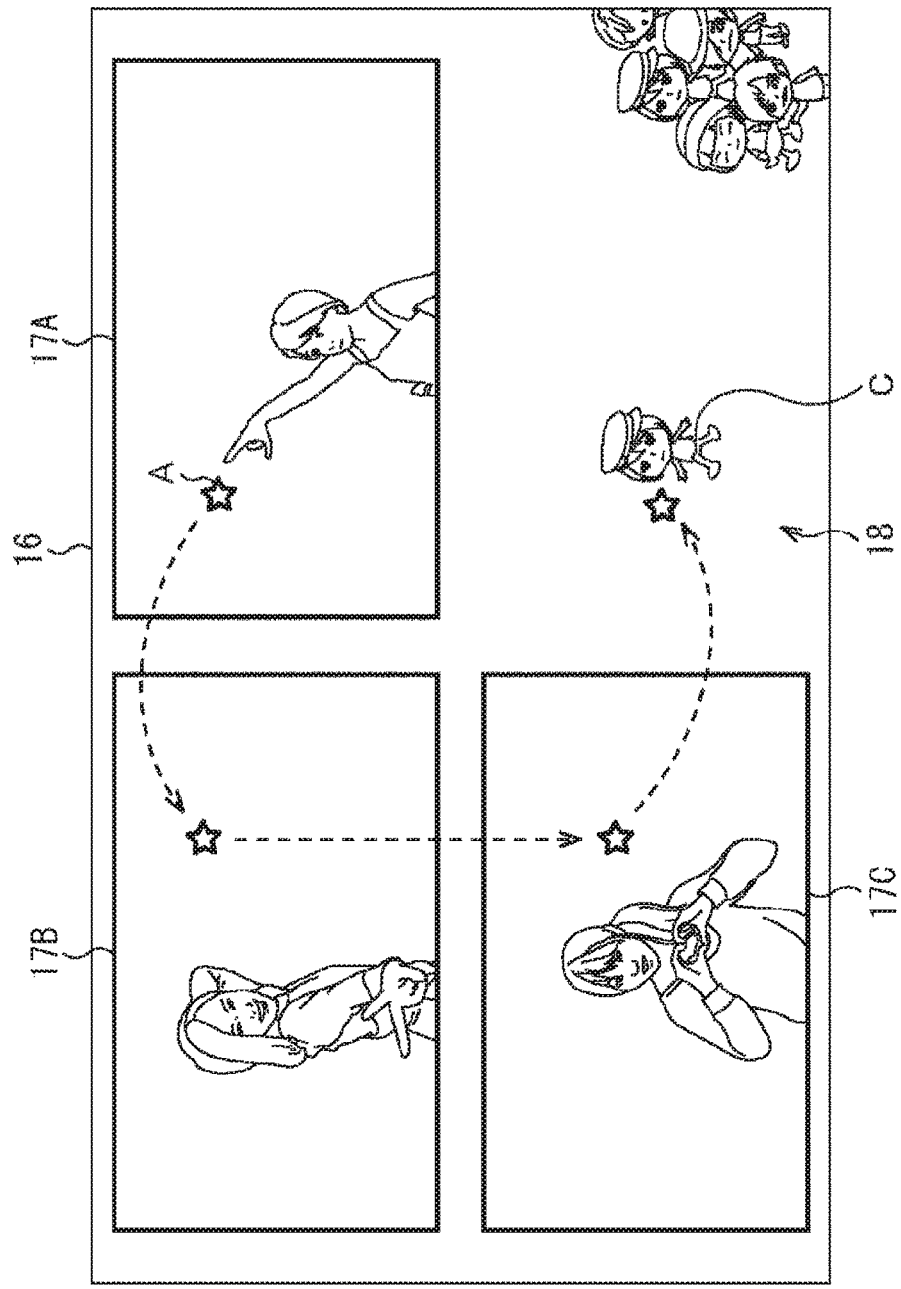
FIG. 17 is a diagram illustrating a display example of a distribution moving image reproduction screen on which a plurality of distribution moving image display areas is displayed.

With reference to FIG. 17, an interactive display in the plurality of distribution moving image display areas 17 will be described.

FIG. 17 illustrates a display example of the distribution moving image reproduction screen 16 on which three distribution moving image display areas 17A to 17C are displayed. For example, when a performer projected on the distribution moving image display area 17A generates an event of throwing the item image A similarly to the description with reference to FIG. 15, the event information is transmitted from the performer side information processing device 15 of the performer projected on the distribution moving image display area 17A to the distribution server 13. Then, in the distribution server 13, on the basis of the event information, by the item display control unit 26, the display of the item image A is controlled so as to be performed interlockingly between the distribution moving image display area 17A and the distribution moving image display area 17B.

Thereafter, the item image A moves from the distribution moving image display area 17B toward the distribution moving image display area 17C, and the item display control unit 26 controls the display interlockingly between the distribution moving image display area 17B and the distribution moving image display area 17C.

Further, the item image A moves from the distribution moving image display area 17C toward the character image C displayed in the outer area 18, and display control information necessary for display in the outer area 18 is transmitted from the distribution server 13 to the viewer side information processing device 14 of the character image C. As a result, the item image A is displayed interlockingly between the distribution moving image display area 17C and the outer area 18, and a rendition is performed in which the item image A reaches the character image C.

As described above, in the moving image distribution system 11, interactive display can be performed in which the item image A is displayed interlockingly between the plurality of distribution moving image display areas 17 and between the distribution moving image display area 17 and the outer area 18. As a result, the moving image distribution system 11 can provide a moving image distribution service having higher interactivity that further improves the sense of unity of a plurality of performers and a viewer.

Figure 18:
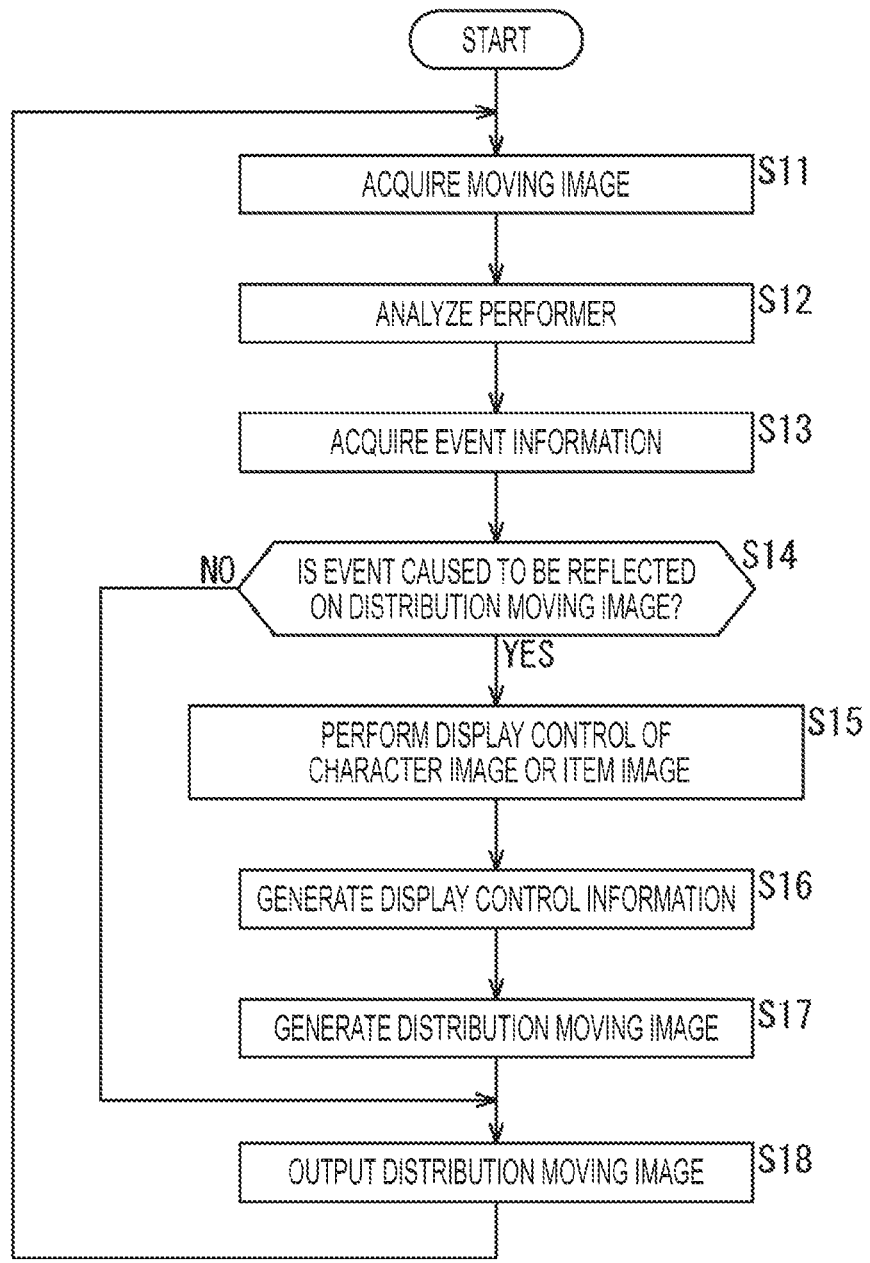
FIG. 18 is a flowchart for describing display processing performed in the distribution server.

Next, FIG. 18 is a flowchart for describing display processing performed in the distribution server 13.

For example, processing is started when the moving image is transmitted from the performer side information processing device 15, and in step S11, the moving image acquisition unit 21 acquires the moving image transmitted from the performer side information processing device 15. Then, the moving image acquisition unit 21 supplies the acquired moving image to the performer analysis unit 23 and the distribution moving image generating unit 27.

In step S12, the performer analysis unit 23 analyzes positions of the face and body of the performer projected on the moving image supplied from the moving image acquisition unit 21 in step S11, and supplies performer display position information indicating a display position of the performer obtained as a result of the analysis to the character display control unit 25 and the item display control unit 26. In addition, the performer analysis unit 23 analyzes a motion, an expression, and the like of the performer, analyzes an object and the like held by the performer, and in a case where the analysis result satisfies an occurrence condition of an event by the performer, supplies event information according to the analysis result to the event information acquisition unit 22.

In step S13, when event information is transmitted via the network 12 or the event information is supplied from the performer analysis unit 23 in step S12, the event information acquisition unit 22 acquires the event information. Note that, when the event information is not transmitted via the network 12 or when the event information is not supplied from the performer analysis unit 23, the processing of step S13 is skipped.

In step S14, the event information acquisition unit 22 determines whether or not to cause the event to be reflected on the distribution moving image. For example, if the event information is acquired in step S13, the event information acquisition unit 22 determines to cause the event to be reflected according to the event information on the distribution moving image.

In step S14, in a case where the event information acquisition unit 22 determines to cause the event to be reflected on the distribution moving image, the processing proceeds to step S15.

In step S15, the event information acquisition unit 22 supplies the event information to the character display control unit 25 or the item display control unit 26 in accordance with the content of the acquired event information. As a result, the character display control unit 25 or the item display control unit 26 performs display control of the character image C or the item image A to be superimposed on the distribution moving image in accordance with the event information.

In step S16, in a case where the character image C or the item image A moves from the distribution moving image display area 17 to the outer area 18, the character display control unit 25 or the item display control unit 26 instructs the display control information generating unit 28 on that effect. In response to the instruction, the display control information generating unit 28 generates display control information necessary for causing the character image C or the item image A to be displayed so that the character image C or the item image A is displayed interlockingly before and after the movement from the distribution moving image display area 17 to the outer area 18, and transmits the display control information via the network 12.

In step S17, the distribution moving image generating unit 27 generates a distribution moving image in which the character image C and the item image A are superimposed and displayed on the moving image supplied from the moving image acquisition unit 21 in step S11 in accordance with the display control in step S15.

After the processing in step S17, or in a case where it is determined not to cause the event to be reflected on the distribution moving image in step S14, the processing proceeds to step S18.

In step S18, the distribution moving image generating unit 27 outputs the distribution moving image, and transmits the distribution moving image to the viewer side information processing device 14 and the performer side information processing device 15 via the network 12. At this time, in a case where the distribution moving image on which the item image A or the character image C is superimposed is generated in step S17, the distribution moving image generating unit 27 outputs the distribution moving image generated in step S17. On the other hand, in a case where it is determined not to cause the event to be reflected on the distribution moving image in step S14, the distribution moving image generating unit 27 outputs the moving image supplied from the moving image acquisition unit 21 in step S11, as a distribution moving image.

After the processing of step S18, the processing returns to step S11, and the next moving image (for example, the next one frame) is set as a processing target, and thereafter, the similar processing is repeated until supply is stopped of the moving image from the performer side information processing device 15.

Figure 19:
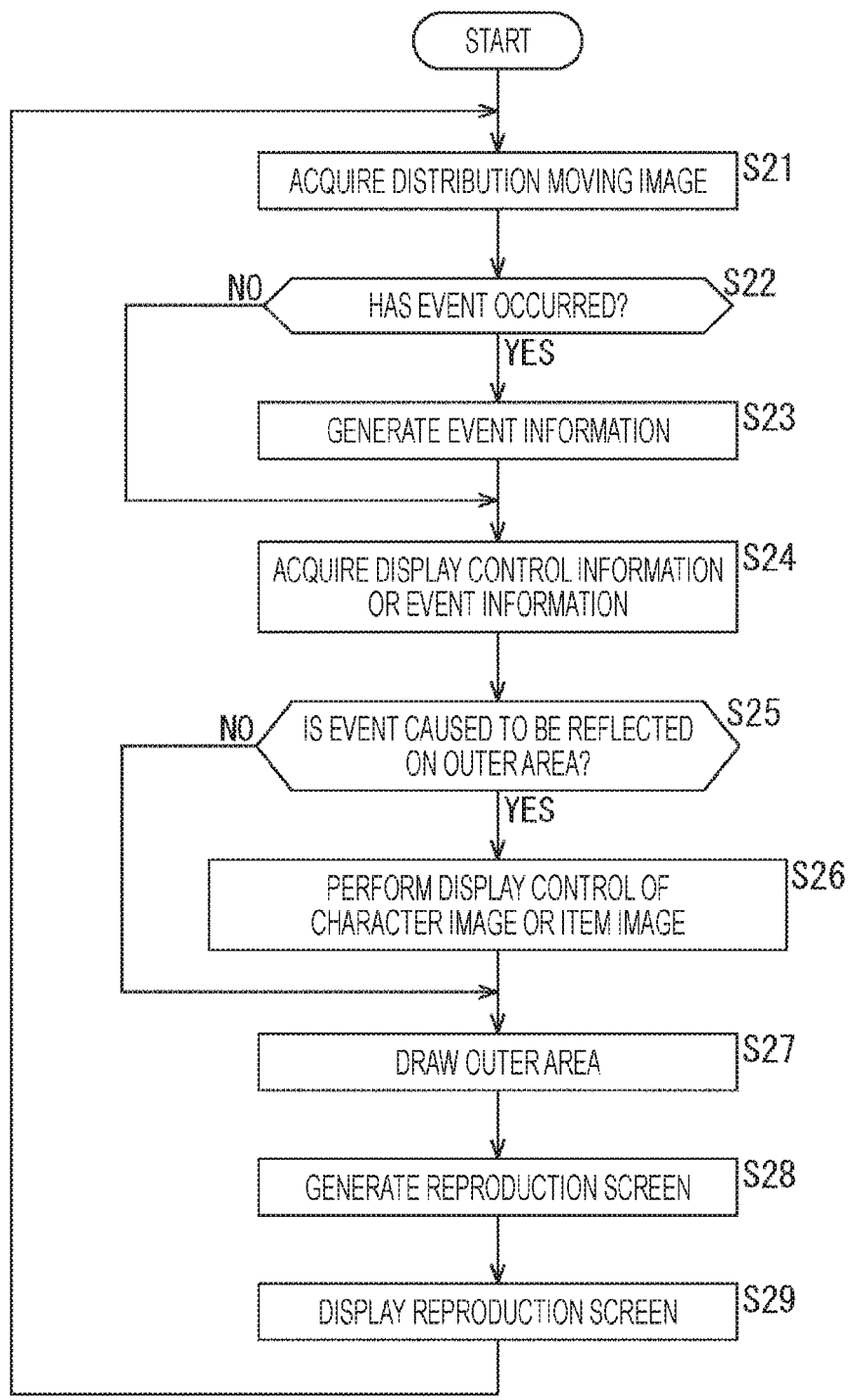
FIG. 19 is a flowchart for describing display processing performed in the viewer side information processing device.

Next, FIG. 19 is a flowchart for describing display processing performed in the viewer side information processing device 14.

For example, processing is started when the distribution moving image is distributed from the distribution server 13, and in step S21, the distribution moving image acquisition unit 41 acquires the distribution moving image distributed from the distribution server 13 via the network 12, and supplies the distribution moving image to the reproduction screen generating unit 47.

In step S22, the event information generating unit 48 determines whether or not an event has occurred. For example, when the viewer performs operation on the operation unit 33 for generating an event, and the operation information is supplied, the event information generating unit 48 determines that the event has occurred.

In step S22, in a case where the event information generating unit 48 determines that the event has occurred, the processing proceeds to step S23.

In step S23, the event information generating unit 48 generates event information corresponding to the operation information supplied from the operation unit 33. Then, the event information generating unit 48 causes the generated event information to be transmitted to the distribution server 13 and the performer side information processing device 15 via the communication unit 31, and also supplies the event information to the display control information acquisition unit 42, and the processing proceeds to step S24.

On the other hand, in a case where the event information generating unit 48 determines that no event has occurred in step S22, the processing skips step S23 and proceeds to step S24.

In step S24, when the display control information is transmitted via the network 12, the display control information acquisition unit 42 acquires the display control information. Alternatively, in a case where the event information generating unit 48 has generated event information in step S23, the display control information acquisition unit 42 acquires the event information. Note that, when the display control information is not transmitted via the network 12 or when the event information generating unit 48 has not generated the event information in step S23, the processing of step S24 is skipped.

In step S25, the display control information acquisition unit 42 determines whether or not to cause the event to be reflected in the outer area 18. For example, when the display control information or the event information is acquired in step S24, the display control information acquisition unit 42 determines to cause the event to be reflected according to the display control information or the event information, in the outer area 18.

In step S25, in a case where the display control information acquisition unit 42 determines to cause the event to be reflected in the outer area 18, the processing proceeds to step S26.

In step S26, the display control information acquisition unit 42 supplies the display control information to the character display control unit 44 or the item display control unit 45 in accordance with the content of the display control information acquired in step S24. Alternatively, the display control information acquisition unit 42 supplies the event information to the character display control unit 44 or the item display control unit 45 in accordance with the content of the event information acquired in step S24.

For example, when the display control information or the event information is supplied to the character display control unit 44, the character display control unit 44 controls the display of the character image C in the outer area 18 in accordance with the display control information or the event information. In addition, when the display control information or the event information is supplied to the item display control unit 45, the item display control unit 45 controls the display of the item image A in the outer area 18 in accordance with the display control information or the event information.

After the processing in step S26, or in a case where the display control information acquisition unit 42 determines not to cause the event to be reflected in the outer area 18 in step S25, the processing proceeds to step S27.

In step S27, the outer area drawing processing unit 46 performs drawing processing of the outer area 18 and supplies the outer area 18 to the reproduction screen generating unit 47. For example, in a case where the display control of the character image C by the character display control unit 44 or the display control of the item image A by the item display control unit 45 is performed in step S26, the outer area drawing processing unit 46 performs drawing processing of drawing the character image C or the item image A in the outer area 18 in accordance with the display control. Alternatively, in a case where the display control information acquisition unit 42 determines not to cause the event to be reflected in the outer area 18 in step S25, drawing processing is performed of drawing the character image C in a state in which no event is performed, in the outer area 18, in step S27.

In step S28, the reproduction screen generating unit 47 displays the distribution moving image supplied from the distribution moving image acquisition unit 41 in step S21 in the distribution moving image display area 17, and generates, in the outside of the distribution moving image display area 17, the distribution moving image reproduction screen 16 that displays the outer area 18 supplied from the outer area drawing processing unit 46 in step S27.

In step S29, the reproduction screen generating unit 47 supplies the distribution moving image reproduction screen 16 generated in step S28 to the display unit 32 to cause the distribution moving image reproduction screen 16 to be displayed.

After the processing of step S29, the processing returns to step S21, and the next moving image (for example, the next one frame) is set as a processing target, and thereafter, the similar processing is repeated until distribution is stopped of the distribution moving image from the distribution server 13.

Note that, also in the performer side information processing device 15, display processing is performed similarly to the display processing described with reference to the flowchart of FIG. 19.

As described above, the display processing is performed in each of the distribution server 13, the viewer side information processing device 14, and the performer side information processing device 15, so that in the moving image distribution system 11, a moving image distribution service can be provided that achieves interactive display in which the character image C, the item image A, and the like are displayed interlockingly between the outer area 18 and the distribution moving image display area 17.

Note that, for example, the moving image distribution system 11 may perform all the display processing (that is, the display processing in the distribution moving image display area 17 and the outer area 18) in the distribution server 13, and distribute the distribution moving image reproduction screen 16 itself from the distribution server 13. Alternatively, in a case where the viewer side information processing device 14 and the performer side information processing device 15 have sufficient processing capability, all the display processing may be performed in the viewer side information processing device 14 and the performer side information processing device 15.

In addition, the interactive display described with reference to FIGS. 6 to 16 is a partial example that can be implemented in the moving image distribution system 11, and display control other than these interactive displays may be performed.

Note that, in the present embodiment, an example has been described in which the display processing is performed in which the character image C, the item image A, and the like are superimposed on the distribution moving image display area 17 or the outer area 18; however, the present technology can be applied to other display processing. For example, a display method may be adopted in which the character image C, the item image A, and the like are synthesized with the distribution moving image display area 17 or the outer area 18 and displayed as one image. In addition, for example, a display method may be adopted in which a plurality of projectors is used, one projector projects the distribution moving image display area 17 and the outer area 18, and other projectors project the character image C, the item image A, and the like, to perform display. Besides, in the present technology, it is possible to adopt various display methods of additionally displaying the character image C, the item image A, and the like on the distribution moving image display area 17 or the outer area 18.

In addition, for example, a personal computer can be used as the viewer side information processing device 14 and the performer side information processing device 15, and also, a so-called smartphone, a game machine, or the like can be used. Further, as the viewer side information processing device 14, for example, by using a head mounted display that can be worn on the viewer's head, it is possible to more strongly render a sense of unity with the performer.

Note that, the processing steps described with reference to the flowcharts need not always be processed in chronological order in accordance with the order described in the flowchart, but the processing steps may be executed in parallel or individually (for example, parallel processing, or processing by objects). In addition, the program may be processed by one CPU, or may be subjected to distributed processing by a plurality of CPUs.

In addition, the above-described series of processing steps (information processing method) can be executed by hardware, or can be executed by software. In a case where the series of processing steps is executed by the software, a program configuring the software is installed from a recording medium in which the program is recorded, to a computer incorporated in dedicated hardware, or, for example, a general purpose personal computer or the like capable of executing various functions by installing various programs.

Figure 20:
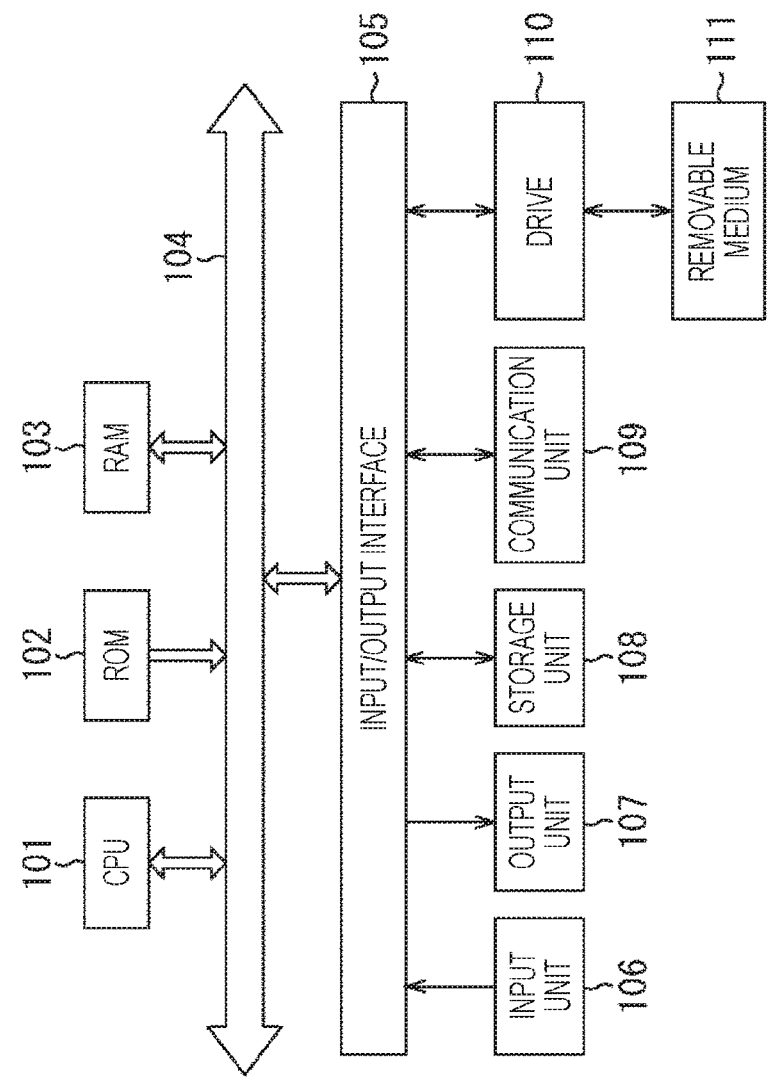
FIG. 20 is a block diagram illustrating a configuration example of an embodiment of a computer to which the present technology is applied.

FIG. 20 is a block diagram illustrating a configuration example of hardware of a computer that executes the above-described series of processing steps by the program.

In the computer, a central processing unit (CPU) 101, read only memory (ROM) 102, and random access memory (RAM) 103 are connected to each other by a bus 104.

An input/output interface 105 is further connected to the bus 104. The input/output interface 105 is connected to: an input unit 106 including a keyboard, a mouse, a microphone, and the like; an output unit 107 including a display, a speaker, and the like; a storage unit 108 including a hard disk, a nonvolatile memory, and the like; a communication unit 109 including a network interface, and the like; and a drive 110 that drives a removable medium 111 such as a magnetic disk, an optical disk, a magneto-optical disk, or a semiconductor memory.

In the computer configured as described above, for example, the CPU 101 loads the program stored in the storage unit 108 to the RAM 103 via the input/output interface 105 and the bus 104 to execute the series of processing steps described above.

The program executed by the computer (CPU 101) is provided by being recorded in, for example, the removable medium 111 that is a package medium including a magnetic disk (including a flexible disk), an optical disk (a compact disc-read only memory (CD-ROM), a digital versatile disc (DVD), and the like), a magneto-optical disk, or a semiconductor memory, or provided via a wired or wireless transmission medium such as a local area network, the Internet, or a digital satellite broadcast.

Then, the program can be installed to the storage unit 108 via the input/output interface 105 by mounting the removable medium 111 to the drive 110. In addition, the program can be installed to the storage unit 108 by being received with the communication unit 109 via the wired or wireless transmission medium. Further, the program can be installed in advance to the ROM 102 and the storage unit 108.

Note that, the present technology can also be configured as described below.

(1)

An information processing device including:

an information acquisition unit that acquires information indicating that an additional image is caused to move from one to another of a distribution moving image display area and an outer area, the additional image being displayed on the distribution moving image display area for displaying a distribution moving image or on the outer area provided outside the distribution moving image display area; and a display control unit that controls display of the additional image on the basis of the information in a case where the additional image moves between the distribution moving image display area and the outer area.

(2)

The information processing device according to (1), in which the information acquisition unit acquires, as the information, event information indicating that a second additional image is caused to move from a first additional image, the second image being the additional image moving toward a performer appearing on the distribution moving image, the first image being the additional image corresponding to a viewer viewing the distribution moving image, and when the second additional image moves from the outer area where the first additional image is displayed to the distribution moving image display area, the display control unit causes the second additional image to be displayed to cause a locus to be contiguous from movement in the outer area to movement in the distribution moving image.

(3)

The information processing device according to (1) or (2), in which the information acquisition unit acquires, as the information, event information indicating that the additional image corresponding to a viewer viewing the distribution moving image performs a predetermined rendition on a performer appearing on the distribution moving image, and the display control unit controls display of the additional image to cause the additional image to be displayed at an arbitrary position other than a display area of the performer in the distribution moving image at timing when the additional image displayed in the outer area is hidden, and to cause the additional image to be hidden on the distribution moving image and also to be displayed in the outer area after the rendition on the performer by the additional image is ended.

(4)

The information processing device according to any of (1) to (3), in which the information acquisition unit acquires, as the information, event information indicating that the additional image is caused to move from the outer area, so as to pass through the distribution moving image, and return to the outer area, and the display control unit controls display of the additional image to cause the additional image to be displayed to cause a locus to be contiguous from movement in the outer area to movement in the distribution moving image when the additional image moves from the outer area to the distribution moving image display area, and to cause a locus to be contiguous from movement in the distribution moving image to movement in the outer area when the additional image moves from the distribution moving image display area to the outer area after the additional image passes through the distribution moving image.

(5)

The information processing device according to any of (1) to (4), in which the information acquisition unit acquires, as the information, event information indicating that a performer appearing on the distribution moving image performs a predetermined rendition on a first additional image that is the additional image corresponding to a viewer viewing the distribution moving image, and the display control unit controls display of a second additional image that is the additional image moving toward the first additional image displayed in the outer area, to cause the second additional image to move from the performer on the distribution moving image to the distribution moving image and to be displayed, and also to cause a locus to be contiguous from movement in the distribution moving image to movement in the outer area when the second additional image moves from the distribution moving image display area to the outer area.

(6)

The information processing device according to any of (1) to (5), in which the display control unit controls display of the second additional image to cause a locus to be contiguous from movement in the outer area to movement in the distribution moving image when the second additional image reaching the first additional image displayed in the outer area moves from the outer area back to the distribution moving image display area.

(7)

The information processing device according to any of (1) to (6), further including a performer analysis unit that analyzes a display position of a performer appearing on the distribution moving image, in which the display control unit controls display of the additional image not to cause the additional image to overlap the display position of the performer.

(8)

The information processing device according to any of (1) to (7), in which the display control unit controls display of the additional image in the distribution moving image display area, and the information processing device further includes a display control information generating unit that generates display control information that is the information necessary for causing interlocking with the display of the additional image by the display control unit when the additional image is caused to be displayed in the outer area in another information processing device that displays the distribution moving image.

(9)

The information processing device according to (8), in which the display control information generated by the display control information generating unit is also supplied to the display control unit, and the display control unit causes the display control information to be reflected on the display of the additional image when performing next processing on the moving image.

(10)

The information processing device according to (1), further including:

a moving image acquisition unit that acquires a moving image on which a performer appearing on the distribution moving image is projected; and a distribution moving image generating unit that generates the distribution moving image by adding the additional image to the moving image acquired by the moving image acquisition unit in accordance with control of display by the display control unit, in which the information acquisition unit acquires, as the information, event information transmitted from another information processing device in accordance with operation by a viewer viewing the distribution moving image in the other information processing device, and the display control unit controls display of the additional image in the distribution moving image display area on the basis of the event information.

(11)

The information processing device according to (1), in which the information acquisition unit acquires, as the information, display control information necessary for causing the additional image to be displayed interlockingly between the distribution moving image display area and the outer area when causing the additional image to move from the distribution moving image display area to the outer area, the display control information being transmitted from another information processing device, and the display control unit controls display of the additional image in the outer area on the basis of the display control information, the information processing device further includes:

a distribution moving image acquisition unit that acquires the distribution moving image distributed from the other information processing device;

an outer area drawing processing unit that performs drawing in the outer area to cause the additional image to be displayed in accordance with control of display of the additional image by the display control unit; and a reproduction screen generating unit that generates a reproduction screen that displays the distribution moving image acquired by the distribution moving image acquisition unit in the distribution moving image display area, and displays, outside the distribution moving image display area, the outer area drawn by the outer area drawing processing unit.

(12)

The information processing device according to any of (1) to (11), in which in a case where a plurality of the distribution moving image display areas is displayed, the display control unit controls display of the additional image to cause movement of the additional image to be performed interlockingly from one of the distribution moving image display areas to another of the distribution moving image display areas.

(13)

An information processing method including:

acquiring information indicating that an additional image is caused to move from one to another of a distribution moving image display area and an outer area, the additional image being displayed on the distribution moving image display area for displaying a distribution moving image or on the outer area provided outside the distribution moving image display area; and controlling display of the additional image on the basis of the information in a case where the additional image moves between the distribution moving image display area and the outer area.

(14)

A program for causing a computer to execute information processing, the information processing including:

acquiring information indicating that an additional image is caused to move from one to another of a distribution moving image display area and an outer area, the additional image being displayed on the distribution moving image display area for displaying a distribution moving image or on the outer area provided outside the distribution moving image display area; and controlling display of the additional image on the basis of the information in a case where the additional image moves between the distribution moving image display area and the outer area.

(15)

A moving image distribution system including a plurality of information processing devices connected together via a network, the information processing devices each including:

an information acquisition unit that acquires information indicating that an additional image is caused to move from one to another of a distribution moving image display area and an outer area, the additional image being displayed on the distribution moving image display area for displaying a distribution moving image or on the outer area provided outside the distribution moving image display area; and a display control unit that controls display of the additional image on the basis of the information in a case where the additional image moves between the distribution moving image display area and the outer area.

Note that, the present embodiment is not limited to the embodiment described above, and various modifications are possible without departing from the scope of the present disclosure.

REFERENCE SIGNS LIST

11 Moving image distribution system
12 Network
13 Distribution server
14 Viewer side information processing device
15 Performer side information processing device
16 Distribution moving image reproduction screen
17 Distribution moving image display area
18 Outer area
19 Stand
21 Moving image acquisition unit
22 Event information acquisition unit
23 Performer analysis unit
24 Storage unit
25 Character display control unit
26 Item display control unit
27 Distribution moving image generating unit
28 Display control information generating unit
31 Communication unit
32 Display unit
33 Operation unit
34 Distribution moving image processing unit
35 Imaging unit
41 Distribution moving image acquisition unit
42 Display control information acquisition unit
43 Storage unit
44 Character display control unit
45 Item display control unit
46 Outer area drawing processing unit
47 Reproduction screen generating unit
48 Event information generating unit

The invention claimed is:

1. A first information processing device, comprising:
a first central processing unit (CPU) configured to:
acquire first event information from a second information processing device, wherein
the first event information includes first information to control movement of a first image from an outer area of a display screen of the second information processing device to a distribution moving image display area of the display screen,
the distribution moving image display area includes a distribution moving image,
the first image corresponds to a viewer associated with the second information processing device,
the distribution moving image includes a performer image of a performer, and
the outer area is outside the distribution moving image display area;
control the second information processing device, based on the first event information, to display the first image superimposed on the distribution moving image in the distribution moving image display area;

generate second event information associated with a gesture of the performer in the performer image, wherein the second event information includes second information to control movement of a second image from the distribution moving image display area of the display screen to the outer area of the display screen, and the second image is associated with the performer in the performer image; and control the second information processing device, based on the second event information, to display the second image on the outer area of the display screen.

2. The first information processing device according to claim 1, wherein the first CPU is further configured to:

acquire third event information from the second information processing device, wherein the outer area includes a third image and the first image, the third image corresponds to the viewer associated with the second information processing device, and the third event information includes third information to control movement of the third image from the first image in the outer area toward the performer image in the distribution moving image display area; and control the second information processing device, based on the third event information, to display the third image such that a locus of the movement of the third image from the outer area to the distribution moving image display area is contiguous.

3. The first information processing device according to claim 1, wherein the first event information indicates a rendition associated with the first image and the performer image, and the first CPU is further configured to:

control a position of the first image in the distribution moving image based on a timing at which the first image is hidden in the outer area, wherein the position of the first image in the distribution moving image is different from a display area of the performer image in the distribution moving image;

control the second information processing device, based on end of the rendition, to hide the first image in the distribution moving image; and control the second information processing device, based on the first image hidden in the distribution moving image, to display the first image in the outer area.

4. The first information processing device according to claim 1, wherein the first CPU is further configured to:

acquire third event information from the second information processing device, wherein the third event information includes third information to control movement of the first image from the outer area, so as to pass through the distribution moving image display area, and return to the outer area;

control the second information processing device, based on the third event information, to display the first image such that a first locus of the movement of the first image from the outer area to the distribution moving image display area is contiguous; and control the second information processing device, subsequent to the movement of the first image from the outer area to the distribution moving image display area, to display the first image such that a second locus of the movement of the first image from the distribution moving image display area to the outer area is contiguous.

5. The first information processing device according to claim 1, wherein a first locus of the movement of the second image from the distribution moving image display area to the outer area is contiguous.

6. The first information processing device according to claim 5, wherein the first CPU is further configured to control the second information processing device to display the second image such that a second locus of movement of the second image from the outer area to the distribution moving image display area is contiguous, and the movement of the second image from the outer area to the distribution moving image display area is subsequent to the movement of the second image from the distribution moving image display area to the outer area.

7. The first information processing device according to claim 1, wherein the first CPU is further configured to:

analyze a first display position of the performer in the distribution moving image display area; and control the second information processing device to display the first image at a second display position in the distribution moving image display area, and the first display position is different from the second display position.

8. The first information processing device according to claim 1, wherein the first CPU is further configured to:

control the second information processing device to display the first image in the distribution moving image display area; and generate display control information to display the first image interlockingly between the distribution moving image display area and the outer area, in a case where the first image is to be displayed in the outer area in the second information processing device that displays the distribution moving image.

9. The first information processing device according to claim 8, wherein the first CPU is further configured to control reflection of the display control information on the first image.

10. The first information processing device according to claim 1, wherein the first CPU is further configured to:

acquire the distribution moving image from a third information processing device associated with the performer; and acquire the first event information based on an operation of the viewer associated with the second information processing device.

11. The first information processing device according to claim 1, wherein the first CPU is further configured to:

generate display control information to display the first image interlockingly between the distribution moving image display area and the outer area, wherein the generation of the display control information is based on movement of the first image from the distribution moving image display area to the outer area; and transmit the display control information to the second information processing device, and the second information processing device includes a second CPU that:
controls the display of the first image in the outer area based on the display control information;
acquires the distribution moving image from the first information processing device;
executes a drawing operation in the outer area to display the first image;
generates a reproduction screen to display the acquired distribution moving image in the distribution moving image display area; and
controls display of the outer area outside the distribution moving image display area.

12. The first information processing device according to claim 1, wherein
the display screen further includes a plurality of distribution moving image display areas, and
the first CPU is further configured to control the second information processing device to display the first image to move the first image interlockingly from a first distribution moving image display area of the plurality of distribution moving image display areas to a second distribution moving image display area of the plurality of distribution moving image display areas.

13. An information processing method, comprising:
in a first information processing device:
acquiring first event information from a second information processing device, wherein
the first event information includes first information to control movement of a first image from an outer area of a display screen of the second information processing device to a distribution moving image display area of the display screen,
the distribution moving image display area includes a distribution moving image,
the first image corresponds to a viewer associated with the second information processing device,
the distribution moving image includes a performer image of a performer, and
the outer area is outside the distribution moving image display area;
controlling the second information processing device, based on the first event information, to display the first image superimposed on the distribution moving image in the distribution moving image display area;
generating second event information associated with a gesture of the performer in the performer image, wherein
the second event information includes second information to control movement of a second image from the distribution moving image display area of the display screen to the outer area of the display screen, and
the second image is associated with the performer in the performer image; and
controlling the second information processing device, based on the second event information, to display the second image on the outer area of the display screen.

14. A non-transitory computer-readable medium having stored thereon, computer-executable instructions which, when executed by a processor of a first information processing device, cause the processor to execute operations, the operations comprising:
acquiring first event information from a second information processing device, wherein
the first event information includes first information to control movement of a first image from an outer area of a display screen of the second information processing device to a distribution moving image display area of the display screen,
the distribution moving image display area includes a distribution moving image,
the first image corresponds to a viewer associated with the second information processing device,
the distribution moving image includes a performer image of a performer, and
the outer area is outside the distribution moving image display area;
controlling the second information processing device, based on the first event information, to display the first image superimposed on the distribution moving image in the distribution moving image display area;
generating second event information associated with a gesture of the performer in the performer image, wherein
the second event information includes second information to control movement of a second image from the distribution moving image display area of the display screen to the outer area of the display screen, and
the second image is associated with the performer in the performer image; and
controlling the second information processing device, based on the second event information, to display the second image on the outer area of the display screen.

15. A moving image distribution system, comprising:
a plurality of information processing devices connected together via a network, wherein
a first information processing device of the plurality of information processing devices includes a central processing unit (CPU) configured to:
acquire first event information from a second information processing device of the plurality of information processing devices, wherein
the first event information includes first information to control movement of a first image from an outer area of a display screen of the second information processing device to a distribution moving image display area of the display screen,
the distribution moving image display area includes a distribution moving image,
the first image corresponds to a viewer associated with the second information processing device,
the distribution moving image includes a performer image of a performer, and
the outer area is outside the distribution moving image display area;
control the second information processing device, based on the first event information, to display the first image superimposed on the distribution moving image in the distribution moving image display area;
generate second event information associated with a gesture of the performer in the performer image, wherein
the second event information includes second information to control movement of a second image from the distribution moving image display area of the display screen to the outer area of the display screen, and the second image is associated with the performer in the performer image; and control the second information processing device, based on the second event information, to display the second image on the outer area of the display screen.

* * * * *